(12) United States Patent
Oguri

(10) Patent No.: US 8,845,478 B2
(45) Date of Patent: Sep. 30, 2014

(54) AUTOMATIC TRANSMISSION

(75) Inventor: Kazuo Oguri, Hiroshima (JP)

(73) Assignee: Jatco Ltd, Fuji-shi (JP)

( * ) Notice: Subject to any disclaimer, the term of this patent is extended or adjusted under 35 U.S.C. 154(b) by 268 days.

(21) Appl. No.: 13/331,565

(22) Filed: Dec. 20, 2011

(65) Prior Publication Data
US 2012/0165156 A1    Jun. 28, 2012

(30) Foreign Application Priority Data

Dec. 22, 2010   (JP) ................................. 2010-286332

(51) Int. Cl.
*F16H 3/58* (2006.01)
*F16H 3/78* (2006.01)
(52) U.S. Cl.
USPC ........... 475/285; 475/303; 475/313; 475/325; 475/338
(58) Field of Classification Search
USPC ......... 475/284, 285, 296, 297, 303, 312, 313, 475/324, 325, 338
See application file for complete search history.

(56) References Cited

U.S. PATENT DOCUMENTS

| 2,293,358 | A | 8/1942 | Pollard |
| 6,669,596 | B1 * | 12/2003 | Sefcik ........................... 475/325 |
| 7,566,286 | B2 * | 7/2009 | Hemphill et al. ............ 475/303 |
| 2006/0079368 | A1 | 4/2006 | Hemphill et al. |

FOREIGN PATENT DOCUMENTS

| DE | 10 2008 010 064 A1 | 8/2009 |
| JP | 06-323377 A | 11/1994 |

* cited by examiner

*Primary Examiner* — Jacob S Scott
(74) *Attorney, Agent, or Firm* — Foley & Lardner LLP

(57) ABSTRACT

To disable engine braking so as to act at a given shift stage in a D range selected manually, and to enable engine braking so as to act at the given shift stage in an L range, an automatic transmission includes first and second meshing mechanisms. The transmission further includes a one-way clutch, a first linkage for meshing the first meshing mechanism in synchronism with N-to-D movement, and a second linkage for meshing the second meshing mechanism in synchronism with D-to-L movement. A rotating part permits a driving force to be transmitted from an input member via the one-way clutch with the first meshing mechanism meshed in the D range and permits a driving force to be transmitted from the input member, without transmitting via the one-way clutch, with the first and second meshing mechanisms each meshed in the L range.

8 Claims, 11 Drawing Sheets

SHIFT CONTROL LINKAGE

R SELECTION

N SELECTION

D SELECTION

L SELECTION

|   |     | C1 | B1 | B2 | D1 | D2 | OWC |
|---|-----|----|----|----|----|----|-----|
| D | 1st |    | ○  |    | D-SIDE |  | ○ |
|   | 2nd |    |    | ○  | D-SIDE |  | ○ |
|   | 3rd | ○  |    |    | D-SIDE |  | ○ |
|   | 4th | ○  |    | ○  | D-SIDE |  |   |
| L | 1st |    | ○  |    | D-SIDE | L-SIDE |   |
|   | 2nd |    |    |    | D-SIDE | L-SIDE |   |
|   | 3rd | ○  |    | ○  | D-SIDE | L-SIDE |   |
| R |     |    | ○  |    | R-SIDE |  |   |

|   |     | C1 | B1 | B2 | C2 | D1 | D2 | OWC |
|---|-----|----|----|----|----|----|----|-----|
| D | 1st |    | ◯  |    |    | D-SIDE |   | ◯ |
|   | 2nd |    |    | ◯  |    | D-SIDE |   | ◯ |
|   | 3rd |    |    |    | ◯  | D-SIDE |   | ◯ |
|   | 4th | ◯  |    |    |    | D-SIDE |   | ◯ |
|   | 5th | ◯  |    |    | ◯  | D-SIDE |   |   |
|   | 6th | ◯  |    | ◯  |    | D-SIDE |   |   |
| L | 1st |    | ◯  |    |    | D-SIDE | L-SIDE |   |
|   | 2nd |    |    | ◯  |    | D-SIDE | L-SIDE |   |
|   | 3rd |    |    |    | ◯  | D-SIDE | L-SIDE |   |
|   | 4th | ◯  |    |    |    | D-SIDE | L-SIDE |   |
| R |     |    | ◯  |    |    | R-SIDE |   |   |

|   |     | C1 | B1 | B2 | C2 | C3 | D1 | D2 | OWC |
|---|-----|----|----|----|----|----|--------|--------|-----|
| D | 1st |    | ○  |    |    |    | D-SIDE |        | ○   |
|   | 2nd |    |    | ○  |    |    | D-SIDE |        | ○   |
|   | 3rd |    |    |    |    | ○  | D-SIDE |        | ○   |
|   | 4th |    |    |    | ○  |    | D-SIDE |        | ○   |
|   | 5th | ○  |    |    |    |    | D-SIDE |        | ○   |
|   | 6th | ○  |    |    | ○  |    | D-SIDE |        |     |
|   | 7th | ○  |    |    |    | ○  | D-SIDE |        |     |
|   | 8th | ○  |    | ○  |    |    | D-SIDE |        |     |
| L | 1st |    | ○  |    |    |    | D-SIDE | L-SIDE |     |
|   | 2nd |    |    | ○  |    |    | D-SIDE | L-SIDE |     |
|   | 3rd |    |    |    |    | ○  | D-SIDE | L-SIDE |     |
|   | 4th |    |    |    | ○  |    | D-SIDE | L-SIDE |     |
|   | 5th | ○  |    |    |    |    | D-SIDE | L-SIDE |     |
| R |     |    | ○  |    |    |    | R-SIDE |        |     |

AUTOMATIC TRANSMISSION

TECHNICAL FIELD

The present invention relates to a stepped automatic transmission whose number of speeds is limited or infinite and which is suited for an automotive transmission.

BACKGROUND ART

In recent years, there have been proposed and developed various automatic transmissions in which a dog clutch, serving as a meshing mechanism, is used to lock a rotary member to a transmission housing so as to hold the rotary member stationary. One such dog-clutch equipped automatic transmission has been disclosed in Japanese Patent Provisional Publication No. 6-323377 (hereinafter is referred to as "JP6-323377"). However, JP6-323377 does not refer to the difficulty of controlling the timing of operation of such a dog clutch. Actually, the dog-clutch equipped transmission requires an electronically-controlled actuator for engagement and disengagement of the dog clutch, and also requires control data needed to electronically control the engagement/disengagement timing of the dog clutch. Thus, room for simplification of control data is left.

SUMMARY OF THE INVENTION

It is, therefore, in view of the previously-described disadvantages of the prior art, an object of the invention to provide an automatic transmission capable of operating each individual meshing mechanism without causing an increase of control data.

In order to accomplish the aforementioned and other objects of the present invention, an automatic transmission having a reverse range for backward-running, a neutral range in which there is no power transmission, a drive range for forward-running by automatic gear shifting, and a low range for forward-running at a given shift stage, and disabling an engine braking force to act at the given shift stage when the drive range is selected by manually operating a selector lever, and enabling an engine braking force to act at the given shift stage when the low range is manually selected, comprises an input member adapted to be connected to a transmission input shaft, a first meshing mechanism having a first hub rotating with the input member, a first sleeve rotating with the first hub and configured to be slidable in two opposite rotation-axis directions, and a first clutch gear configured to be rotatable together with the first sleeve by bringing the first clutch gear into meshed-engagement with the first sleeve by an axial sliding motion of the first sleeve, a second meshing mechanism having a second hub rotating with the first clutch gear, a second sleeve rotating with the second hub and configured to be slidable in the two opposite rotation-axis directions, and a second clutch gear configured to be rotatable together with the second sleeve by bringing the second clutch gear into meshed-engagement with the second sleeve by an axial sliding motion of the second sleeve, a one-way clutch provided between the second hub and the second clutch gear and configured to run free when a revolution speed of the second clutch gear is higher than that of the second hub, a first linkage for bringing the first meshing mechanism into meshed-engagement with the first clutch gear by sliding the first sleeve in synchronism with manual movement of the selector lever from the neutral range to the drive range, a second linkage for bringing the second meshing mechanism into meshed-engagement with the second clutch gear by sliding the second sleeve in synchronism with manual movement of the selector lever from the drive range to the low range, and a first rotating part connected to the second clutch gear and configured to permit a driving force to be transmitted from the input member via the one-way clutch to the first rotating part with the first meshing mechanism kept in meshed-engagement with the first clutch gear when the drive range is selected and further configured to permit a driving force to be transmitted from the input member not via the one-way clutch to the first rotating part with the first meshing mechanism kept in meshed-engagement with the first clutch gear and the second meshing mechanism kept in meshed-engagement with the second clutch gear when the low range is selected.

According to another aspect of the invention, an automatic transmission having a reverse range for backward-running, a neutral range in which there is no power transmission, a drive range for forward-running by automatic gear shifting, and a low range for forward-running at a given shift stage, and disabling an engine braking force to act at the given shift stage when the drive range is selected by manually operating a selector lever, and enabling an engine braking force to act at the given shift stage when the low range is selected by manually operating the selector lever, comprises an input member adapted to be connected to a transmission input shaft, a first meshing mechanism having a first hub rotating with the input member, a first sleeve rotating with the first hub and configured to be slidable in two opposite rotation-axis directions, and a first clutch gear configured to be rotatable together with the first sleeve by bringing the first clutch gear into meshed-engagement with the first sleeve by an axial sliding motion of the first sleeve, a second meshing mechanism having a second hub rotating with the input member, a second sleeve rotating with the second hub and configured to be slidable in the two opposite rotation-axis directions, and a second clutch gear configured to be rotatable together with the second sleeve by bringing the second clutch gear into meshed-engagement with the second sleeve by an axial sliding motion of the second sleeve, a one-way clutch provided between the first clutch gear and the second clutch gear and configured to run free when a revolution speed of the second clutch gear is higher than that of the first clutch gear, a first linkage for bringing the first meshing mechanism into meshed-engagement with the first clutch gear by sliding the first sleeve in synchronism with manual movement of the selector lever from the neutral range to the drive range, a second linkage for bringing the second meshing mechanism into meshed-engagement with the second clutch gear by sliding the second sleeve in synchronism with manual movement of the selector lever from the drive range to the low range, and a first rotating part connected to the second clutch gear and configured to permit a driving force to be transmitted from the input member via the one-way clutch to the first rotating part with the first meshing mechanism kept in meshed-engagement with the first clutch gear when the drive range is selected and further configured to permit a driving force to be transmitted from the input member not via the one-way clutch to the first rotating part with the first meshing mechanism kept in meshed-engagement with the first clutch gear and the second meshing mechanism kept in meshed-engagement with the second clutch gear when the low range is selected.

The other objects and features of this invention will become understood from the following description with reference to the accompanying drawings.

DESCRIPTION OF THE PREFERRED EMBODIMENTS

First Embodiment

Figure 1:
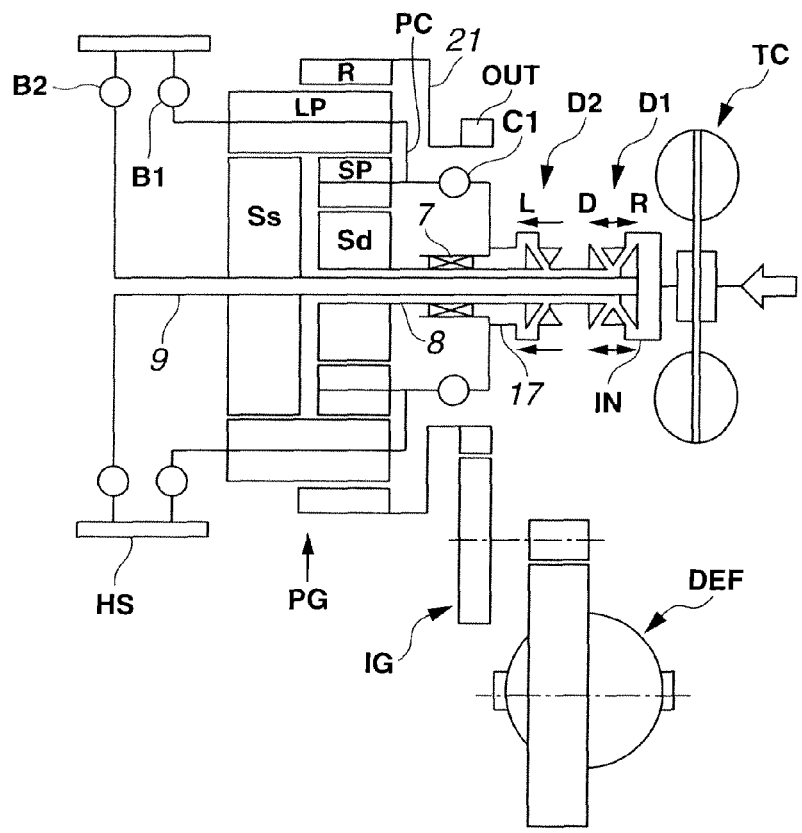
FIG. 1 is a skeleton diagram illustrating a first embodiment of a stepped automatic transmission.

Referring now to the drawings, particularly to FIG. 1, the stepped automatic transmission of the first embodiment is exemplified in an automotive transmission. The automatic transmission of the first embodiment includes a torque converter TC that provides a torque-multiplication effect by which a driving force (driving torque) inputted from a driving power source (e.g., an engine) is multiplied, first and second meshing mechanisms D1 and D2 by means of which a power-transmission path (a power-flow path) is switched, and a gear train comprised of a planetary gear system. As shown in FIG. 1, in the first embodiment, as a gear train, a so-called Ravigneaux type planetary gearset PG is used. Planetary gearset PG has a small-diameter sun gear Sd, a ring gear R, a long pinion LP meshed with both of the small-diameter sun gear Sd and the ring gear R, and a short pinion SP meshed with both of the long pinion LP and the small-diameter sun gear Sd. Long pinion LP and short pinion SP are rotatably supported on a common pinion carrier PC.

Planetary gearset PG has four rotary members, namely, (i) a first rotating part 8 connected to the small-diameter sun gear Sd, (ii) a second rotary member 21 through which ring gear R and an output shaft OUT are always connected to each other, (iii) pinion carrier PC serving as a third rotary member, and (iv) a second rotating part 9 connected to a larger-diameter sun gear Ss.

[Construction of Meshing Mechanisms]

Figure 2:
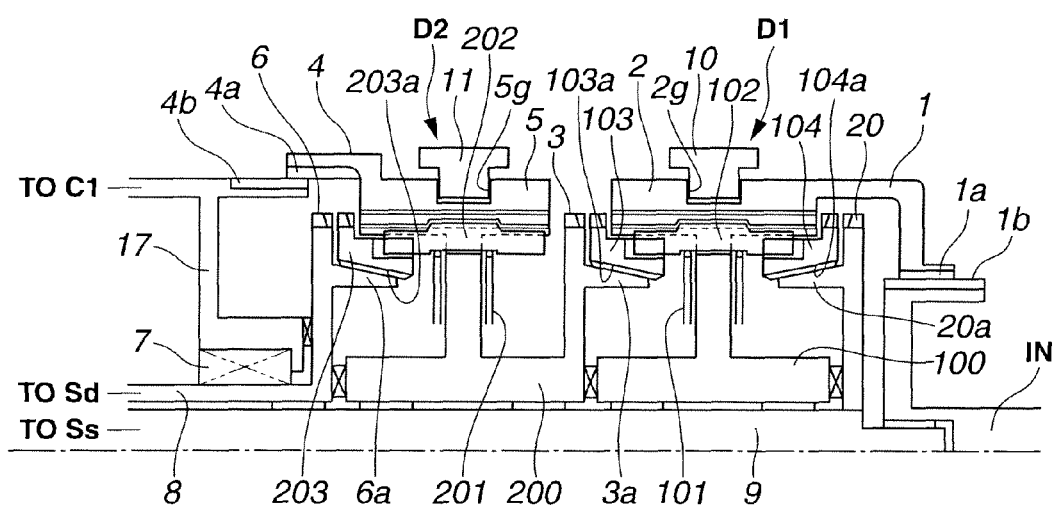
FIG. 2 is an enlarged cross-sectional view illustrating the structure of each of first and second meshing mechanisms used in the transmission of the first embodiment.

Referring now to FIG. 2, there is shown the enlarged cross section of each of first and second meshing mechanisms D1 and D2 used in the transmission of the first embodiment. First meshing mechanism D1 is a so-called synchronizer-equipped dog clutch. First meshing mechanism D1 is constructed by a first hub 1, which is rotating with an input member IN connected via a transmission input shaft to the output side of torque converter TC, a first sleeve 2, which is rotating with the first hub 1 and also moveable in the rotation-axis direction, a first clutch gear 3, which is brought into meshed-engagement with the first sleeve 2 by leftward movement (viewing FIG. 2) of the first sleeve 2 in the rotation-axis direction, and thus rotatable together with the first sleeve 2, and a third clutch gear 20, which is brought into meshed-engagement with the first sleeve 2 by rightward movement (viewing FIG. 2) of the first sleeve 2 in the rotation-axis direction, and thus rotatable together with the first sleeve 2. As clearly shown in FIG. 2, third clutch gear 20 is fixedly connected onto the outer periphery of second rotating part 9. Also provided is a synchronizer hub 100 installed inside of the first sleeve 2 and rotatably supported on the outer periphery of second rotating part 9. A spring 101, insert keys 102, a D-side (a drive-side) balk ring 103, and an R-side (a reverse-side) balk ring 104 are installed between the synchronizer hub 100 and the first sleeve 2.

First hub 1 has an internal splined portion (internal splines) 1a formed on the side of input member IN and kept in fitted-engagement (spline-connection) with an external splined portion (external splines) 1b of input member IN, such that a sliding motion of the first hub 1 relative to the input member IN in the rotation-axis direction is permitted and that the first hub 1 is always rotating with the input member IN. First sleeve 2 has an annular engagement groove 2g formed in its outer periphery. A first shift fork 10 is provided to fit in the annular engagement groove 2g of the first sleeve 2 so as to cause sliding motion of the first sleeve 2 on the synchronizer hub 100 in the rotation-axis direction.

First clutch gear 3 is formed with a first-clutch-gear taper cone 3a extending rightward (viewing FIG. 2) in the rotation-axis direction from the side face of the external toothed portion of the first clutch gear 3. In a similar manner, third clutch gear 20 is formed with a third-clutch-gear taper cone 20a extending leftward (viewing FIG. 2) in the rotation-axis direction from the side face of the external toothed portion of the third clutch gear 20. D-side balk ring 103 is formed on its inner periphery with a taper-cone surface 103a. Thus, a leftward movement (viewing FIG. 2) of the first sleeve 2 in the rotation-axis direction causes the taper-cone surface 103a of D-side balk ring 103 to be brought into frictional-contact with the first-clutch-gear taper cone 3a. The friction between the D-side balk ring 103 and the first clutch gear 3 brings the two (103, 3) into synchronous rotation, thus providing a synchronous action between the input member IN and the first clutch gear 3. In a similar manner, R-side balk ring 104 is formed on its inner periphery with a taper-cone surface 104a. Thus, a rightward movement (viewing FIG. 2) of the first sleeve 2 in the rotation-axis direction causes the taper-cone surface 104*a* of R-side balk ring 104 to be brought into frictional-contact with the third-clutch-gear taper cone 20*a*. The friction between the R-side balk ring 104 and the third clutch gear 20 brings the two (104, 20) into synchronous rotation, thus providing a synchronous action between the input member IN and the third clutch gear 20.

Second meshing mechanism D2 is a so-called synchronizer-equipped dog clutch. Second meshing mechanism D2 is constructed by a second hub 4, which is rotating with the first clutch gear 3, a second sleeve 5, which is rotating with the second hub 4 and also moveable in the rotation-axis direction, a second clutch gear 6, which is brought into meshed-engagement with the second sleeve 5 by leftward movement (viewing FIG. 2) of the second sleeve 5 in the rotation-axis direction, and thus rotatable together with the second sleeve 5. Also provided is a synchronizer hub 200 installed inside of the second sleeve 5 and rotatably supported on the outer periphery of second rotating part 9. Synchronizer hub 200 is formed integral with the first clutch gear 3 in a manner so as to rotate with the first clutch gear. A spring 201, insert keys 202, and an L-side (a low-side) balk ring 203 are installed between the synchronizer hub 200 and the second sleeve 5.

Second hub 4 has an internal splined portion (internal splines) 4*a* formed on the side of planetary gearset PG and kept in fitted-engagement (spline-connection) with an external splined portion (external splines) 4*b* of a rotary member 17, such that a sliding motion of the second hub 4 relative to the rotary member 17 in the rotation-axis direction is permitted and that the second hub 4 is always rotating with the rotary member 17. Second sleeve 5 has an annular engagement groove 5*g* formed in its outer periphery. A second shift fork 11 is provided to fit in the annular engagement groove 5*g* of the second sleeve 5 so as to cause sliding motion of the second sleeve 5 on the synchronizer hub 200 in the rotation-axis direction.

Second clutch gear 6 is formed with a second-clutch-gear taper cone 6*a* extending rightward (viewing FIG. 2) in the rotation-axis direction from the side face of the external toothed portion of the second clutch gear 6. L-side balk ring 203 is formed on its inner periphery with a taper-cone surface 203*a*. Thus, a leftward movement (viewing FIG. 2) of the second sleeve 5 in the rotation-axis direction causes the taper-cone surface 203*a* of L-side balk ring 203 to be brought into frictional-contact with the second-clutch-gear taper cone 6*a*. The friction between the L-side balk ring 203 and the second clutch gear 6 brings the two (203, 6) into synchronous rotation, thus providing a synchronous action between the first clutch gear 3 and the second clutch gear 6. A one-way clutch 7 is provided between the first rotating part 8 (connected to the second clutch gear 6) and the rotary member 17 (splined to the second hub 4). In other words, one-way clutch 7 is provided between the second hub 4 and the second clutch gear 6. When a revolution speed of the second clutch gear 6 is higher than that of the second hub 4, one-way clutch 7 allows the second clutch gear 6 to run free of the second hub 4. Conversely when a revolution speed of the second clutch gear 6 is lower than or equal to that of the second hub 4, one-way clutch 7 acts to bring the second clutch gear 6 into meshed-engagement with the second hub 4.

[Construction of Shift Control Linkage]

Figure 3A:
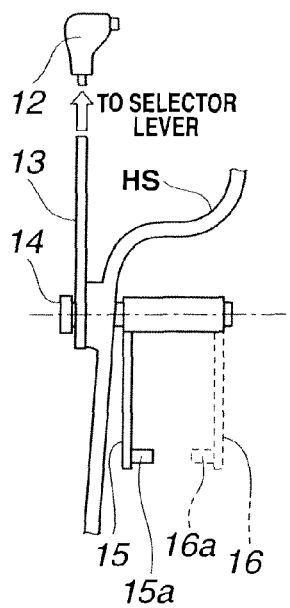
FIGS. 3A-3E are schematic diagrams illustrating the structure of a shift control linkage used in the transmission of the first embodiment.
Figure 3B:
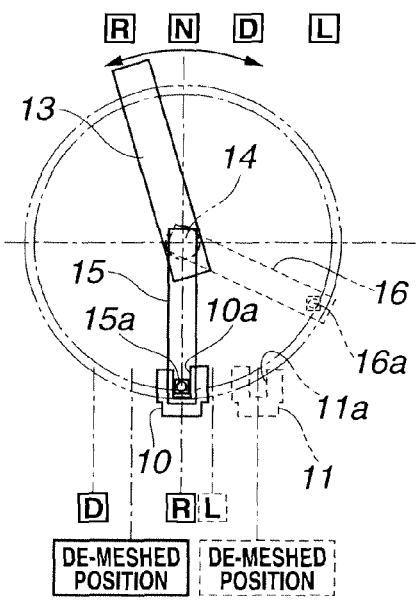
Figure 3C:
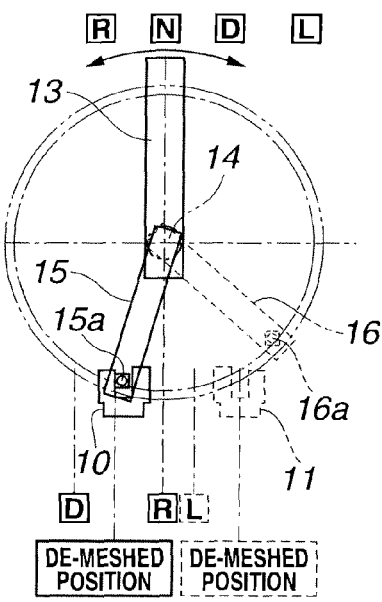

Referring now to FIGS. 3A-3E, there is shown the construction and operation of the shift control linkage used in the transmission of the first embodiment. FIG. 3A is a schematic cross section of the shift control linkage, as viewed in the radial direction. FIGS. 3B-3E are schematic diagrams of the shift control linkage, as viewed in the rotation-axis direction. A selector lever 12, which is operated by the driver, is installed in a vehicle compartment, for selecting a range position of the automatic transmission. Range positions indicated on the selector lever 12 are an R (reverse) range position, an N (neutral) range position, and an L (low) range position. When the R (reverse) selection is made, the transmission reverses the direction of rotation of driving wheels (not shown) so that the vehicle backs up. When the N (neutral) selection is made, there is no power transmission. When the D (drive) selection is made, the vehicle can run ahead by automatic gear shifting. When the L (low) selection is made, the vehicle can run ahead at a given shift stage ranging from a first-speed gear position to a third-speed gear position. These range positions are arranged on the selector lever 12 in order of the R, N, D, and L range. By manually moving the selector lever 12 back and forth by the driver, the range position can be switched. Selector lever 2 is mechanically linked to the upper end (viewing FIG. 3A) of a connecting member 13 through a linkage (not shown).

A manual shaft 14 is rotatably mounted on a housing HS, in a manner so as to penetrate the housing HS. The lower end (viewing FIG. 3A) of connecting member 13 is fixedly connected to the manual shaft 14 outside of the housing HS. In other words, connecting member 13 serves as a plate-like link member extending radially from the manual shaft 14, and configured to circumferentially rotate around the axis of manual shaft 14 toward an angular position corresponding to the selected range position.

First and second manual plates 15 and 16 are fixedly connected to the manual shaft 14 inside of the housing HS. First manual plate 15 (indicated by the solid line in FIGS. 3A-3E) is a member extending radially outward from the manual shaft 14. An engagement pin 15*a* is fixedly connected to the outermost end of the first manual plate 15 so that the axis of pin 15*a* extends parallel to the axial direction of manual shaft 14. Second manual plate 16 (indicated by the broken line in FIGS. 3A-3E) is a member extending radially outward from the manual shaft 14. An engagement pin 16*a* is fixedly connected to the outermost end of the second manual plate 16 so that the axis of pin 16*a* extends parallel to the axial direction of manual shaft 14. In the shown embodiment, first manual plate 15 is located adjacent to the inner wall of housing HS in the axial direction of manual shaft 14, whereas second manual plate 16 is located at a position somewhat spaced apart from the inner wall of housing HS in the axial direction of manual shaft 14. As appreciated, the positional relationship between installation positions of first and second manual plates 15-16 is not limited to the particular embodiment shown and described herein. Such a positional relationship of first and second manual plates 15-16 may be appropriately varied depending on the internal structure of the automatic transmission.

As viewed in the axial direction of manual shaft 14 (see FIGS. 3B-3E), connecting member 13, and first and second manual plates 15-16 are fixedly connected to the manual shaft 14, such that these plates 13, 15, and 16 are respectively laid out at three different predetermined angular positions. Connecting member 13 and first manual plate 15 are major components constructing the first linkage, whereas connecting member 13 and second manual plate 16 are major components constructing the second linkage.

Regarding the first linkage (13, 15), when the R selection is made, the engagement pin 15*a* of first manual plate 15 is kept in fitted-engagement with an engagement groove 10*a* formed in the outer periphery of the first shift fork 10. The engaged state of pin 15*a* and groove 10*a* corresponds to a position of the rotation-axis direction in which the first sleeve 2 and the third clutch gear 20 are meshed with each other (see FIG. 3B).

When selector lever 12 is moved from reverse (R) to neutral (N), the engaged state of pin 15a and groove 10a remains unchanged. The engaged state of pin 15a and groove 10a corresponds to a position of the rotation-axis direction in which the first sleeve 2 and the third clutch gear 20 are de-meshed from each other and the first sleeve 2 and the first clutch gear 3 are de-meshed from each other (see FIG. 3C).

Thereafter, when connecting member 13 is further rotated in synchronism with movement of selector lever 12 from neutral (N) to drive (D), pin 15a is not yet disengaged from the groove 10a and thus the first-manual-plate pin 15a remains linked to the first sleeve 2 via the first-shift-fork groove 10a. According to a sliding motion of the first sleeve 2, caused by a further clockwise rotary motion of the first manual plate 15, the first meshing mechanism D1 is shifted into a meshed-engagement state in which the first sleeve 2 and the first clutch gear 3 are meshed with each other (see FIG. 3D).

Figure 3D:
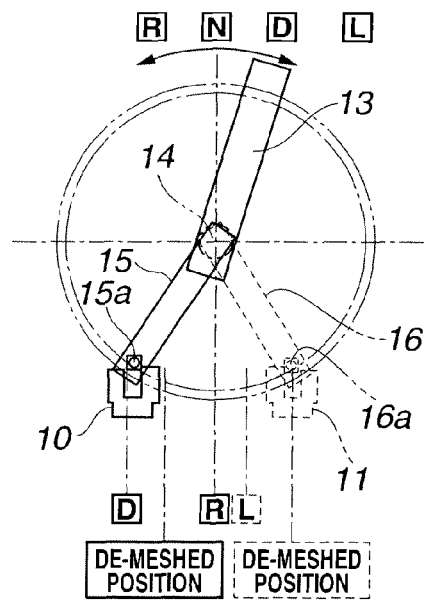
Figure 3E:
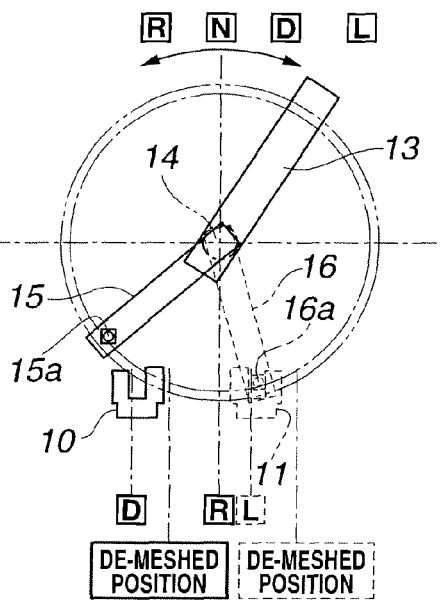

After this, when connecting member 13 is still further rotated in synchronism with the driver's selector-lever operation from drive (D) to low (L), pin 15a becomes disengaged from the groove 10a by a still further clockwise rotary motion of first manual plate 15 and thus the first-manual-plate pin 15a becomes disconnected from the first sleeve 2 (see FIG. 3E).

That is, pin 15a moves on the circumference of a circle specified by the arm length of first manual plate 15 and therefore a change of the position of pin 15a in the vertical direction as well as a change of the position of pin 15a in the rotation-axis direction occurs according to a rotary motion of first manual plate 15. Hence, the relationship of engagement/disengagement between pin 15a and groove 10a can be properly set by adjustment of the groove depth of groove 10a, such that, when an angular displacement of first manual plate 15 from its initial position, corresponding to the R range position, reaches a predetermined angle, a vertical displacement of pin 15a from the initial position exceeds a preset groove depth of groove 10a and thus the first manual plate 15 becomes disengaged from the first shift fork 10 (see a vertical-displacement change (a state transition) of pin 15a from the state shown in FIG. 3D to the state shown in FIG. 3E). Under the disengaged state of pin 15a and groove 10a, when the first manual plate 15 is rotated in the opposite rotation direction (in the anticlockwise direction, viewing FIG. 3E), pin 15a moves downward and reaches groove 10a. Then, the first manual plate 15 re-engages with the first shift fork 10 (see a vertical-displacement change (a state transition) of pin 15a from the state shown in FIG. 3D to the state shown in FIG. 3C).

Regarding the second linkage (13, 16), when connecting member 13 is rotated in synchronism with the driver's selector-lever operation from drive (D) to low (L), a state transition from a disengaged state of an engagement groove 11a formed in the outer periphery of the second shift fork 11 and the engagement pin 16a of second manual plate 16 to an engaged state of groove 11a and pin 16a occurs and thus the second-manual-plate pin 16a becomes linked to the second sleeve 5 via the second-shift-fork groove 11a (see a vertical-displacement change (a state transition) of pin 16a from the state shown in FIG. 3D to the state shown in FIG. 3E). According to a sliding motion of the second sleeve 5, caused by a clockwise rotary motion of second manual plate 16, the second meshing mechanism D2 is shifted into a meshed-engagement state in which the second sleeve 5 and the second clutch gear 6 are meshed with each other (see FIG. 3E). Conversely when connecting member 13 is rotated in synchronism with movement of selector lever 12 from low (L) to drive (D), pin 16a becomes disengaged from the groove 11a by an anticlockwise rotary motion of second manual plate 16 and thus the second-manual-plate pin 16a becomes disconnected from the second sleeve 5 (see a vertical-displacement change (a state transition) of pin 16a from the state shown in FIG. 3E to the state shown in FIG. 3D). With the pin 16a disengaged from the groove 11a, in other words, with the second-manual-plate pin 16a disconnected from the second sleeve 5, there is no occurrence of sliding motion of the second sleeve 5 in the rotation-axis direction.

[Construction of Friction Elements of Automatic Transmission]

The automatic transmission is provided with one clutch (a first friction element C1) and two brake bands (a second friction element B1 and a third friction element B2). First friction element C1 is provided between pinion carrier PC and rotary member 17 (the first clutch gear 3), for selectively connecting the pinion carrier PC to the rotary member 17. Second friction element B1 is provided between pinion carrier PC and housing HS, for selectively locking the pinion carrier PC to the housing HS. Third friction element B2 is provided between second rotating part 9 and housing HS for selectively locking the second rotating part 9 (the large-diameter sun gear Ss) to the housing HS. Output shaft OUT has an output gear formed thereon. Driving torque (driving force) is delivered from the output gear through a counter gear IG and a differential gear DEF to the driving wheels (not shown). In the first embodiment, output shaft OUT is compactly housed and enclosed by means of the second friction element B1, the third friction element B2, and the housing HS, all constructing band brakes, and thus the automatic transmission of the first embodiment is suited for a front-engine front-drive (FF) automobile.

[Shift Stages Achieved by Automatic Transmission]

Figures 4, 5:
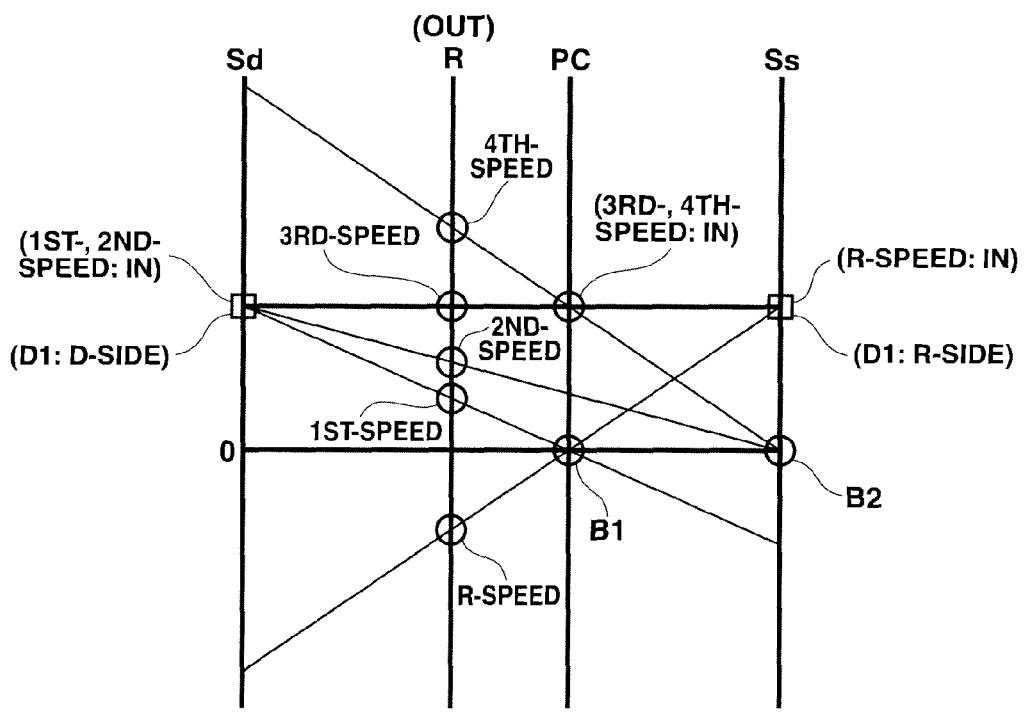
FIG. 4 is a clutch-engagement and band-application chart for engagement/disengagement (application/release) of each of friction elements of the transmission of the first embodiment, for all shift stages (for all transmission operating conditions).
FIG. 5 is an alignment chart of the transmission of the first embodiment.

FIG. 4 shows the clutch-engagement and brake-band-application chart for engagement/disengagement (application/release) of each of friction elements of the transmission of the first embodiment, for all shift stages. FIG. 5 shows the alignment chart of the transmission of the first embodiment. In FIG. 4, clutch-engagement or band-application is marked with a voided circle indicated by a fine solid line, whereas clutch-disengagement or band-release is indicated by a blank space.

(In Case of D-Range Selection)

A first-speed gear is achieved by application of the second friction element B1. A second-speed gear is achieved by application of the third friction element B2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), one-way clutch 7 is engaged and thereby driving torque (driving force) is inputted from the small-diameter sun gear Sd. In contrast, with the vehicle coasting or freewheeling, one-way clutch 7 becomes disengaged and hence there is no engine braking effect.

A third-speed gear is achieved by engagement of the first friction element C1. A fourth-speed gear is achieved by engagement of the first friction element C1 and application of the third friction element B2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), driving torque (driving force) is inputted from the pinion carrier PC through the first friction element C1. In the case of the D-range 3rd-speed gear position, with the engine driving the vehicle (in the presence of driving-torque input from the engine to the transmission), the first rotating part 8 and the rotary member 17 are coupled with each other via one-way clutch 7 and thus driving torque is also inputted from the small-diameter sun gear Sd. In contrast, with the vehicle coasting, one-way clutch 7 becomes disengaged to allow the pinion carrier PC to run free of the engine and hence there is no engine braking effect. On the other hand, in the case of the D-range 4th-speed gear position, with the third friction element B2 applied, small-diameter sun gear Sd is always rotating faster than the pinion carrier PC (rotary member 17) and thus one-way clutch 7 is kept in its disengaged state and hence there is no coupling action via one-way clutch 7, and thereby always an engine-braking force acts. However, in the D-range 4th-speed gear position, due to a transmission ratio set to a vehicle-speed-increase side, so great engine braking force does not act.

(In Case of L-Range Selection)

In the case of the L-range selection, friction elements are engaged or applied in a manner similar to the previously-discussed D-range selection. Additionally, as can be seen from the clutch-engagement and band-application chart of FIG. 4, the second meshing mechanism D2 (exactly, the L-side of second meshing mechanism D2) as well as the first meshing mechanism D1 (exactly, the D-side of first meshing mechanism D1) is engaged. With the second meshing mechanism D2 engaged, the first rotating part 8 and the rotary member 17 are coupled with each other not via one-way clutch 7. The L-range selection differs from the D-range selection in that, with the vehicle coasting, an engine braking force acts at each of the L-range 1st-speed gear position, the L-range 2nd-speed gear position, and the L-range 3rd-speed gear position by virtue of the action of one-way clutch 7.

(In Case of R-Range Selection)

A reverse-speed gear is achieved by application of the second friction element B1. Regarding first and second meshing mechanisms D1-D2, only the first meshing mechanism D1 (exactly, the R-side of first meshing mechanism D1) is engaged, that is, the first sleeve 2 and the third clutch gear 20 are meshed with each other. Hence, with the engine driving the vehicle (in the presence of driving-torque input from the engine to the transmission), driving torque (driving force) is inputted from the large-diameter sun gear Ss. At this time, there is no power transmission via one-way clutch 7, and thereby an engine-braking force acts even with the vehicle coasting.

(Operation and Effects of Driver-Operated Selector Lever)

As previously described, when the range position is selected or specified by manually operating or moving the selector lever 12 by the driver, the first sleeve 2 and/or the second sleeve 5 can be operated (axially slid) depending on the selected range position via the first linkage (13, 15) and the second linkage (13, 16), so as to switch a power-transmission path by means of first and second meshing mechanisms D1-D2. That is, when operating each of first and second meshing mechanisms D1-D2, a driver-applied selector-lever operating force is utilized and thus the power-transmission path can be manually switched by means of the mechanical linkages (13, 15; 13, 16). Additionally, each of first and second meshing mechanisms D1-D2 can be engaged completely in synchronism with the driver's selector-lever operation timing, thus eliminating the need for electronically controlling the timing of switching between meshed (engaged) and de-meshed (disengaged) states of each of first and second meshing mechanisms D1-D2. That is, in accordance with the driver's wishes, it is possible to realize switching between meshed (engaged) and de-meshed (disengaged) states of each of first and second meshing mechanisms D1-D2 at the optimal timing without using an electronically-controlled actuators, in other words, without any control data required for electronically controlling these actuators.

As discussed above, the automatic transmission of the first embodiment can provide the following operation and effects (1)-(4).

(1) In an automatic transmission having a reverse (R) range for backward-running, a neutral (N) range in which there is no power transmission, a drive (D) range for forward-running by automatic gear shifting, and a low (L) range for forward-running at a given shift stage, and disabling an engine braking force to act at the given shift stage when the D range is selected by manually operating a selector lever 12, and enabling an engine braking force to act at the given shift stage when the L range is manually selected, the automatic transmission includes an input member IN adapted to be connected to a transmission input shaft, a first meshing mechanism D1 having a first hub 1 rotating with the input member IN, a first sleeve 2 rotating with the first hub 1 and configured to be slidable in two opposite rotation-axis directions, and a first clutch gear 3 configured to be rotatable together with the first sleeve 2 by bringing the first clutch gear 3 into meshed-engagement with the first sleeve 2 by an axial sliding motion of the first sleeve 2, a second meshing mechanism D2 having a second hub 4 rotating with the first clutch gear 3, a second sleeve 5 rotating with the second hub 4 and configured to be slidable in the two opposite rotation-axis directions, and a second clutch gear 6 configured to be rotatable together with the second sleeve 5 by bringing the second clutch gear 6 into meshed-engagement with the second sleeve 5 by an axial sliding motion of the second sleeve 5, a one-way clutch 7 provided between the second hub 4 and the second clutch gear 6 and configured to run free when a revolution speed of the second clutch gear 6 is higher than that of the second hub 4, a first linkage for bringing the first meshing mechanism D1 into meshed-engagement with the first clutch gear 3 by sliding the first sleeve 2 in synchronism with manual movement of the selector lever 12 from the N range to the D range, a second linkage for bringing the second meshing mechanism D2 into meshed-engagement with the second clutch gear 6 by sliding the second sleeve 5 in synchronism with manual movement of the selector lever 12 from the D range to the L range, and a first rotating part 8 connected to the second clutch gear 6 and configured to permit a driving force to be transmitted from the input member IN via the one-way clutch 7 to the first rotating part 8 with the first meshing mechanism D1 kept in meshed-engagement with the first clutch gear 3 when the D range is selected and further configured to permit a driving force to be transmitted from the input member IN not via the one-way clutch 7 to the first rotating part 8 with the first meshing mechanism D1 kept in meshed-engagement with the first clutch gear 3 and the second meshing mechanism D2 kept in meshed-engagement with the second clutch gear 6 when the L range is selected.

That is, by means of the first linkage and the second linkage, it is possible to attain switching between meshed (engaged) and de-meshed (disengaged) states of each of first and second meshing mechanisms D1-D2 in synchronism with manual movement of the selector lever 12. When the D-range selection has been made or when the L-range selection has been made, the provision of these linkages eliminates the need for preparing for control data required for electronically controlling first and second meshing mechanisms D1-D2, thus enabling greatly simplified control data.

In the shown embodiment, input member IN is connected to torque converter TC, and whereby input member IN is coupled with the engine via the torque converter TC. It will be appreciated that, input member IN should be connected to the automatic transmission such that torque is inputted to the input member IN directly or indirectly.

Also, in the shown embodiment, each of meshing mechanisms (D1; D2) is exemplified as a synchronizer-equipped dog clutch. It will be understood that the fundamental concept of the invention may be applied to a non-synchronizer equipped dog clutch.

(2) The first meshing mechanism D1 has a third clutch gear 20 configured to be rotatable together with the first sleeve 2 by bringing the third clutch gear 20 into meshed-engagement with the first sleeve 2 by the opposite axial sliding motion of the first sleeve 2. The first linkage has a linkage for bringing the first meshing mechanism D1 into meshed-engagement with the third clutch gear 20 by sliding the first sleeve 2 in synchronism with manual movement of the selector lever 12 from the N range to the R range. Also provided is a second rotating part 9 connected to the third clutch gear 20 and configured to permit a driving force to be transmitted from the input member IN to the second rotating part 9 with the first sleeve 2 meshed with the third clutch gear 20 when the R range is selected.

That is, by means of the first linkage, it is possible to attain switching between meshed (engaged) and de-meshed (disengaged) states of first meshing mechanism D1 in synchronism with manual movement of the selector lever 12. When the R-range selection has been made, the provision of the first linkage eliminates the need for preparing for control data required for electronically controlling first meshing mechanism D1, thus enabling more greatly simplified control data. Additionally, the third clutch gear 20 is brought into meshed-engagement with the first sleeve 2 only when the R-range selection is made. Therefore, there is no risk that the first clutch gear 3 and the third clutch gear 20 are simultaneously coupled with input member IN. From this viewpoint, with the advantageous opposed arrangement of the first and third clutch gears 3 and 20, in which the third clutch gear 20, installed on the outer periphery of second rotating part 9, is arranged to be opposed to the first clutch gear 3 (see the first-clutch-gear taper cone 3a and the third-clutch-gear taper cone 20a axially opposed to each other in the rotation-axis direction in FIG. 2), while sandwiching the first hub 1 (the first sleeve 2), the first sleeve 2 of first meshing mechanism D1 can be brought into meshed-engagement with the third clutch gear 20 with a reliable manual range gear shift when the R-range selection is made. In the same manner, with the advantageous opposed arrangement of the first and third clutch gears 3 and 20, the first sleeve 2 of first meshing mechanism D1 can be brought into meshed-engagement with the first clutch gear 3 with a reliable manual range gear shift when the D-range selection is made. Hence, the opposed arrangement eliminates the necessity of having an additional hub-and-sleeve for coupling the third clutch gear 20 with the input member IN, thus simplifying the construction and configuration of the meshing mechanisms.

(3) The first linkage has a first manual plate 15 rotated in synchronism with rotary motion of a manual shaft 14 whose angular displacement is determined based on a manually selected position of the selector lever 12, and a first shift fork 10 configured to cause the axial sliding motion of the first sleeve 2, while being engaged with the first sleeve 2 by an angular displacement of the first manual plate 15 caused by manual movement of the selector lever 12 from the N range to the D range, and configured to be disengaged from the first sleeve 2 by an angular displacement of the first manual plate 15 caused by manual movement of the selector lever 12 from the D range to the L range. The second linkage has a second manual plate 16 rotated in synchronism with rotary motion of the manual shaft 14, and a second shift fork 11 configured to cause the axial sliding motion of the second sleeve 5, while being engaged with the second sleeve 5 by an angular displacement of the second manual plate 16 caused by manual movement of the selector lever 12 from the D range to the L range, and configured to be disengaged from the second sleeve 5 by an angular displacement of the second manual plate 16 caused by manual movement of the selector lever 12 from the D range to the N range.

In this manner, the first linkage (10, 13, 15) and the second linkage (11, 13, 16) are configured to move in synchronism with manual movement of the selector lever 12. Thus, it is possible to attain switching between meshed (engaged) and de-meshed (disengaged) states of each of first and second meshing mechanisms D1-D2 depending on the selected range position.

In the shown embodiment, the first manual plate 15 and the second manual plate 16 are manufactured as two separate members, namely, one member extending radially outward from a first predetermined angular position of manual shaft 14 and the other member extending radially outward from a second predetermined angular position of manual shaft 14. In lieu thereof, these manual plates may be integrally formed as a single manual plate assembly.

(4) The automatic transmission further includes a planetary gearset PG having a small-diameter sun gear Sd (a first sun gear) connected to the first rotating part 8, a large-diameter sun gear Ss (a second sun gear) connected to the second rotating part 9, a ring gear R, a short pinion SP meshed with the small-diameter sun gear Sd, a long pinion LP meshed with all of the short pinion SP, the large-diameter sun gear Ss and the ring gear R, and a pinion carrier PC on which the short pinion SP and the long pinion LP are rotatably supported, an output shaft OUT always connected to the ring gear R, a first friction element C1 for selectively connecting the first clutch gear 3 to the pinion carrier PC, a second friction element B1 for selectively locking up the pinion carrier PC to hold the pinion carrier PC stationary, and a third friction element B2 for selectively locking up the large-diameter sun gear Ss to hold the large-diameter sun gear Ss stationary, thereby achieving four forward speeds and one reverse speed.

Therefore, it is possible to connect the rotating element (i.e., the rotating member) to the input member IN via the meshing mechanism (D1; D2), while simplifying control data, and whereby it is possible to provide an automatic transmission that achieves four forward speeds and one reverse speed with a greatly enhanced power-transmission efficiency.

Second Embodiment

Figure 6:
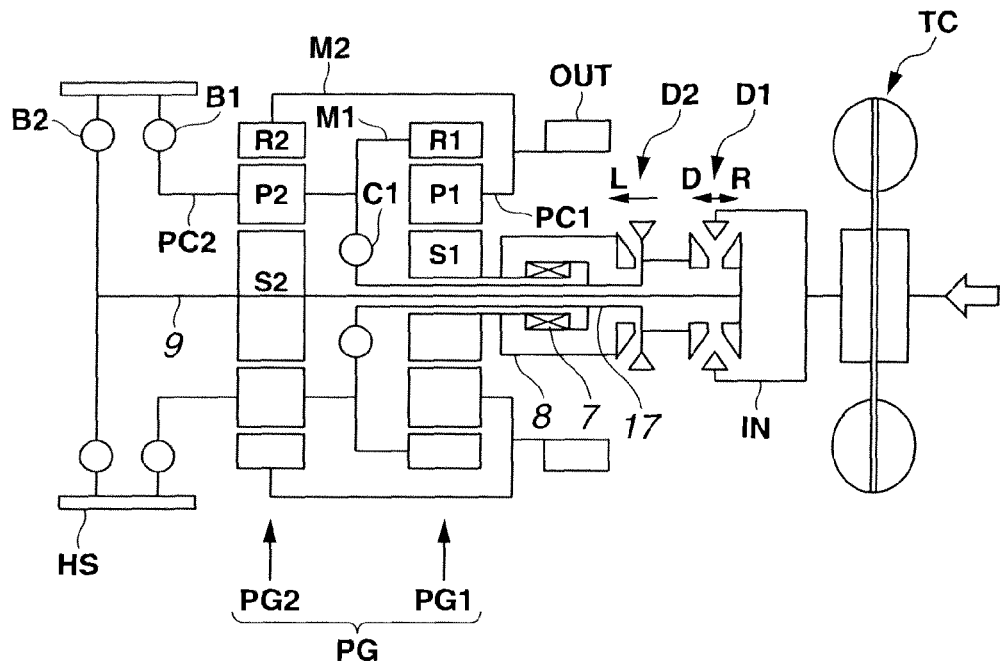
FIG. 6 is a skeleton diagram of a second embodiment of a stepped automatic transmission.
Figure 7:
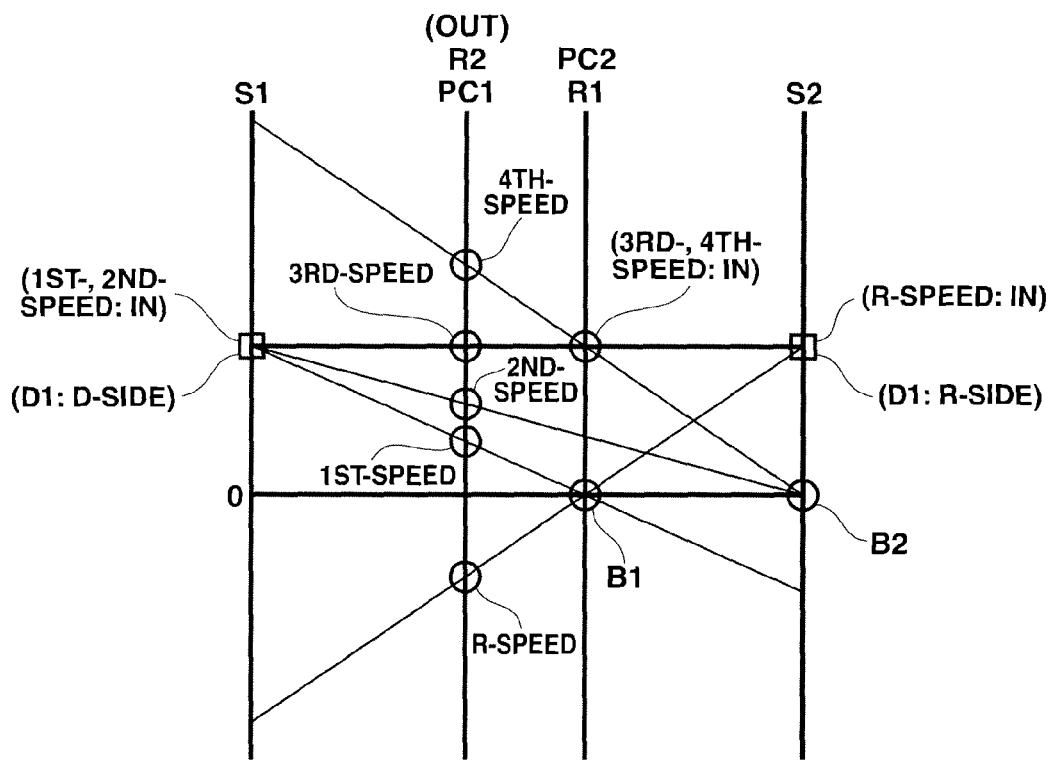
FIG. 7 is an alignment chart of the transmission of the second embodiment.

Referring to FIGS. 6-7, there is shown the stepped automatic transmission of the second embodiment. First and second meshing mechanisms D1-D2 are the same in the first and second embodiments, and thus only the point of the transmission of the second embodiment, differing from the first embodiment, is hereunder described. As seen from the skeleton diagram of FIG. 6, the gear train (the planetary gear system) of the second embodiment differs from that of the first embodiment, but the power-transmission path from the transmission to the driving wheels is the same in the first and second embodiments.

The automatic transmission of the second embodiment includes torque converter TC that provides a torque-multiplication effect by which a driving force (driving torque) inputted from a driving power source (e.g., an engine) is multiplied, first and second meshing mechanisms D1 and D2 by means of which the power-transmission path (the power-flow path) is switched, and a gear train comprised of a planetary gear system. As shown in FIG. 6, in the second embodiment, two simple planetary gearsets PG1-PG2 are used as a gear train. The first simple planetary gearset PG1 has a first sun gear S1, a first ring gear R1, a first single pinion P1 meshed with both of first sun gear S1 and first ring gear R1, and a first pinion carrier PC1 on which the first single pinion P1 is rotatably supported. In a similar manner, the second simple planetary gearset PG2 has a second sun gear S2, a second ring gear R2, a second single pinion P2 meshed with both of second sun gear S2 and second ring gear R2, and a second pinion carrier PC2 on which the second single pinion P2 is rotatably supported. Also provided are a first rotary member M1 through which first ring gear R1 and second pinion carrier PC2 are always connected to each other and a second rotary member M2 through which first pinion carrier PC1 and second ring gear R2 are always connected to each other. First and second simple planetary gearsets PG1-PG2, and first and second rotary members M1-M2 construct one planetary gear system PG.

The planetary gear system PG (PG1-PG2) has four rotary members, namely, (i) the first rotating part 8 connected to first sun gear S1, (ii) the second rotary member M2 through which second ring gear R2 and output shaft OUT are always connected to each other, (iii) the second pinion carrier PC2 serving as a third rotary member, and (iv) the second rotating part 9 connected to second sun gear S2.

[Construction of Friction Elements of Automatic Transmission]

The automatic transmission is provided with one clutch (the first friction element C1) and two brake bands (the second friction element B1 and the third friction element B2). First friction element C1 is provided between first rotary member M1 (the first ring gear R1, the second pinion carrier PC2) and rotary member 17 (the first clutch gear 3), for selectively connecting the first rotary member M1 to the rotary member 17. Second friction element B1 is provided between second pinion carrier PC2 and housing HS, for selectively locking the second pinion carrier PC2 to the housing HS. Third friction element B2 is provided between second rotating part 9 and housing HS for selectively locking the second rotating part 9 (the second sun gear S2) to the housing HS.

[Shift Stages Achieved by Automatic Transmission]

The clutch-engagement and brake-band-application chart for engagement/disengagement (application/release) of each of friction elements of the transmission of the second embodiment is the same as the first embodiment (refer to the chart shown in FIG. 4). FIG. 7 shows the alignment chart of the transmission of the second embodiment.

(In Case of D-Range Selection)

A first-speed gear is achieved by application of the second friction element B1. A second-speed gear is achieved by application of the third friction element B2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), one-way clutch 7 is engaged and thereby driving torque (driving force) is inputted from the first sun gear S1. In contrast, with the vehicle coasting or freewheeling, one-way clutch 7 becomes disengaged and hence there is no engine braking effect.

A third-speed gear is achieved by engagement of the first friction element C1. A fourth-speed gear is achieved by engagement of the first friction element C1 and application of the third friction element B2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), driving torque (driving force) is inputted from the first rotary member M1 (the second pinion carrier PC2 and the first ring gear R1) through the first friction element C1. In the case of the D-range 3rd-speed gear position, with the engine driving the vehicle (in the presence of driving-torque input from the engine to the transmission), the first rotating part 8 and the rotary member 17 are coupled with each other via one-way clutch 7 and thus driving torque is also inputted from the first sun gear S1. In contrast, with the vehicle coasting, one-way clutch 7 becomes disengaged and hence there is no engine braking effect. On the other hand, in the case of the D-range 4th-speed gear position, with the third friction element B2 applied, first sun gear S1 is always rotating faster than the first rotary member M1 and thus one-way clutch 7 is kept in its disengaged state and hence there is no coupling action via one-way clutch 7, and thereby always an engine-braking force acts. However, in the D-range 4th-speed gear position, due to a transmission ratio set to a vehicle-speed-increase side, so great engine braking force does not act.

(In Case of L-Range Selection)

In the case of the L-range selection, friction elements are engaged or applied in a manner similar to the previously-discussed D-range selection. Additionally, as can be seen from the clutch-engagement and band-application chart of FIG. 4, the second meshing mechanism D2 (exactly, the L-side of second meshing mechanism D2) as well as the first meshing mechanism D1 (exactly, the D-side of first meshing mechanism D1) is engaged. With the second meshing mechanism D2 engaged, the first rotating part 8 and the rotary member 17 are coupled with each other not via one-way clutch 7. The L-range selection differs from the D-range selection in that, with the vehicle coasting, an engine braking force acts at each of the L-range 1st-speed gear position, the L-range 2nd-speed gear position, and the L-range 3rd-speed gear position by virtue of the action of one-way clutch 7.

(In Case of R-Range Selection)

A reverse-speed gear is achieved by application of the second friction element B1. Regarding first and second meshing mechanisms D1-D2, only the first meshing mechanism D1 (exactly, the R-side of first meshing mechanism D1) is engaged, that is, the first sleeve 2 and the third clutch gear 20 are meshed with each other. Hence, with the engine driving the vehicle (in the presence of driving-torque input from the engine to the transmission), driving torque (driving force) is inputted from the second sun gear S2. At this time, there is no power transmission via one-way clutch 7, and thereby an engine-braking force acts even with the vehicle coasting.

As discussed above, the automatic transmission of the second embodiment can provide the following operation and effects (5) in addition to the previously-described operation and effects (1)-(3) achieved by the first embodiment.

(5) The automatic transmission further includes a first planetary gearset PG1 having a first sun gear S1 connected to the first rotating part 8, a first ring gear R1, a first single pinion P1 meshed with both of the first sun gear S1 and the first ring gear R1, and a first pinion carrier PC1 on which the first single pinion P1 is rotatably supported, a second planetary gearset PG2 having a second sun gear S2 connected to the second rotating part 9, a second ring gear R2, a second single pinion P2 meshed with both of the second sun gear S2 and the second ring gear R2, and a second pinion carrier PC2 on which the second single pinion P2 is rotatably supported, an output shaft OUT always connected to the first pinion carrier PC1, a first rotary member M1 through which the first ring gear R1 and the second pinion carrier PC2 are always connected to each other, a second rotary member M2 through which the first pinion carrier PC1 and the second ring gear R2 are always connected to each other, a first friction element C1 for selectively connecting the first rotary member M1 to the first clutch gear 3, a second friction element B1 for selectively locking up the second pinion carrier PC2 to hold the second pinion carrier PC2 stationary, and a third friction element B2 for selectively locking up the second sun gear S2 to hold the second sun gear S2 stationary, thereby achieving four forward speeds and one reverse speed.

Therefore, it is possible to connect the rotating element (i.e., the rotating member) to the input member IN via the meshing mechanism (D1; D2), while simplifying control data, and whereby it is possible to provide an automatic transmission that achieves four forward speeds and one reverse speed with a greatly enhanced power-transmission efficiency. As compared to the construction of the automatic transmission of the first embodiment equipped with a Ravigneaux type planetary gear system having at least the long pinion LP and the short pinion SP, the automatic transmission of the second embodiment is constructed by a simple planetary gear system, thereby enhancing noise/vibrations reduction/attenuation performance and also lower system costs.

Third Embodiment

Figure 8:
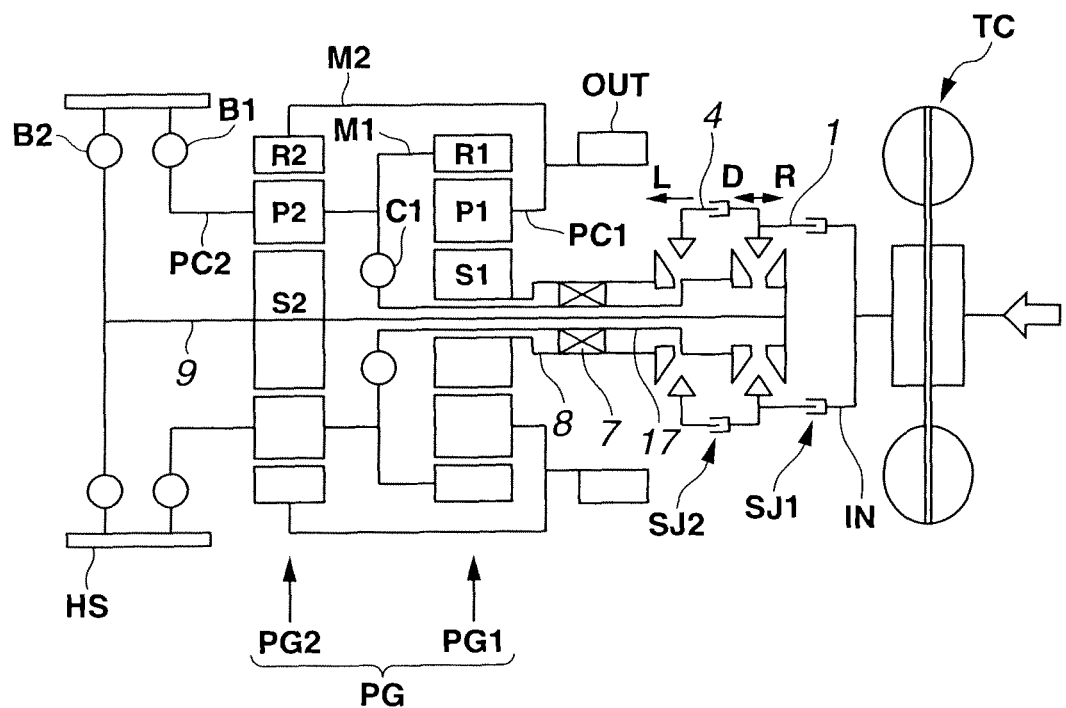
FIG. 8 is a skeleton diagram of a third embodiment of a stepped automatic transmission.

Referring to FIG. 8, there is shown the stepped automatic transmission of the third embodiment. The basic construction of the automatic transmission of the third embodiment is similar to that of the second embodiment. However, as appreciated from comparison between the skeleton diagrams shown in FIG. 6 (the second embodiment) and FIG. 8 (the third embodiment), first and second meshing mechanisms D1-D2 of the third embodiment differ from those of the second embodiment (or the first embodiment), and thus only the point of the transmission of the third embodiment (see FIG. 8), differing from the second embodiment (see FIGS. 6-7), is hereunder described.

[Construction of Meshing Mechanisms]

First, regarding the first meshing mechanism D1 of each of the first and second embodiments, as previously discussed, the first hub 1, rotating with the input member IN, is kept in engagement with input member IN by spline-connection, such that a sliding motion of the first hub 1 relative to the input member IN in the rotation-axis direction is permitted. In contrast, regarding the first meshing mechanism D1 of the third embodiment, the first hub 1 is kept in engagement with the input member IN by means of a first sliding joint SJ1, in a manner so as to permit a sliding motion of the first hub 1 relative to the input member IN in the rotation-axis direction and always permit power-transmission between the first hub 1 and the input member IN via the first sliding joint SJ1.

Second, regarding the second meshing mechanism D2 of each of the first and second embodiments, as previously discussed, for instance, when the D selection is made, the first sleeve 2 of first meshing mechanism D1 can be brought into meshed-engagement with the first clutch gear 3 for coupling the first clutch gear 3 with the input member IN, and whereby the second hub 4 of second meshing mechanism D2 can be coupled with the input member IN via the synchronizer hub 200 formed integral with the first clutch gear 3. In this manner, according to the construction of first and second meshing mechanisms D1-D2 of the first and second embodiments, the driving state of the second hub 4 of second meshing mechanism D2 is dependent on whether the first meshing mechanism D1 is meshed or de-meshed. In contrast, regarding the second meshing mechanism D2 of the third embodiment, the second hub 4 is always kept in engagement with the input member IN by means of a second sliding joint SJ2 (exactly, the second sliding joint SJ2 as well as the first sliding joint SJ1), in a manner so as to permit a sliding motion of the second hub 4 relative to the input member IN (the first hub 1) in the rotation-axis direction and always permit power-transmission between the second hub 2 and the input member IN (the first hub 1) via the second sliding joint SJ2. Additionally, in the third embodiment, the synchronizer hub 200 and the first clutch gear 3 are separated from each other. Hence, according to the construction of first and second meshing mechanisms D1-D2 of the third embodiment, the second hub 4 is rotating or driving regardless of whether the first meshing mechanism D1 is meshed or de-meshed, because of the second hub 4 always kept in engagement with the input member IN by means of the second sliding joint SJ2 (exactly, the second sliding joint SJ2 as well as the first sliding joint SJ1). Of course, as a sliding joint, any type of sliding joint may be used.

As discussed above, the automatic transmission of the third embodiment can provide the following operation and effects (6) in addition to the previously-described operation and effects (2)-(3) achieved by the first embodiment and operation and effects (5) achieved by the second embodiment.

(6) In an automatic transmission having a reverse (R) range for backward-running, a neutral (N) range in which there is no power transmission, a drive (D) range for forward-running by automatic gear shifting, and a low (L) range for forward-running at a given shift stage, and disabling an engine braking force to act at the given shift stage when the D range is selected by manually operating a selector lever 12, and enabling an engine braking force to act at the given shift stage when the L range is manually selected, the automatic transmission includes an input member IN adapted to be connected to a transmission input shaft, a first meshing mechanism D1 having a first hub 1 rotating with the input member IN, a first sleeve 2 rotating with the first hub 1 and configured to be slidable in two opposite rotation-axis directions, and a first clutch gear 3 configured to be rotatable together with the first sleeve 2 by bringing the first clutch gear 3 into meshed-engagement with the first sleeve 2 by an axial sliding motion of the first sleeve 2, a second meshing mechanism D2 having a second hub 4 rotating with the input member IN, a second sleeve 5 rotating with the second hub 4 and configured to be slidable in the two opposite rotation-axis directions, and a second clutch gear 6 configured to be rotatable together with the second sleeve 5 by bringing the second clutch gear 6 into meshed-engagement with the second sleeve 5 by an axial sliding motion of the second sleeve 5, a one-way clutch 7 provided between the first clutch gear 3 and the second clutch gear 6 and configured to run free when a revolution speed of the second clutch gear 6 is higher than that of the first clutch gear 3, a first linkage for bringing the first meshing mechanism D1 into meshed-engagement with the first clutch gear 3 by sliding the first sleeve 2 in synchronism with manual movement of the selector lever 12 from the N range to the D range, a second linkage for bringing the second meshing mechanism D2 into meshed-engagement with the second clutch gear 6 by sliding the second sleeve 5 in synchronism with manual movement of the selector lever 12 from the D range to the L range, and a first rotating part 8 connected to the second clutch gear 6 and configured to permit a driving force to be transmitted from the input member IN via the one-way clutch 7 to the first rotating part 8 with the first meshing mechanism D1 kept in meshed-engagement with the first clutch gear 3 when the D range is selected and further configured to permit a driving force to be transmitted from the input member IN not via the one-way clutch 7 to the first rotating part 8 with the first meshing mechanism D1 kept in meshed-engagement with the first clutch gear 3 and the second meshing mechanism D2 kept in meshed-engagement with the second clutch gear 6 when the L range is selected.

That is, by means of the first linkage and the second linkage, it is possible to attain switching between meshed (engaged) and de-meshed (disengaged) states of each of first and second meshing mechanisms D1-D2 in synchronism with manual movement of the selector lever 12. When the D-range selection has been made or when the L-range selection has been made, the provision of these linkages eliminates the need for preparing for control data required for electronically controlling first and second meshing mechanisms D1-D2, thus enabling greatly simplified control data.

Additionally, in the third embodiment, the first hub 1 is mechanically linked to the input member IN via the first sliding joint SJ1 for power-transmission (rotation-transmission) between the first hub 1 and the input member IN, whereas the second hub 4 is mechanically linked to the input member IN via the second sliding joint SJ2 (exactly, via the first and second sliding joints SJ1-SJ2) for power-transmission (rotation-transmission) between the second hub 4 and the input member IN. Hence, first and second meshing mechanisms D1-D2 can be operated independently of each other. Additionally, regarding a power-transmission path (a power-flow path) from the input member IN, power (rotation or torque) can be transmitted from the input member IN directly to the second hub 4 not via the synchronizer hub 200. Thus, it is possible to greatly enhance the durability of synchronizer hub 200.

Fourth Embodiment

Referring now to FIGS. 9-12, there is shown the stepped automatic transmission of the fourth embodiment. The basic constructions of first and second meshing mechanisms D1-D2 of the automatic transmission of the fourth embodiment are similar to those of the first embodiment, and thus only the point of the transmission of the fourth embodiment, differing from the first embodiment, is hereunder described.

Figure 9:
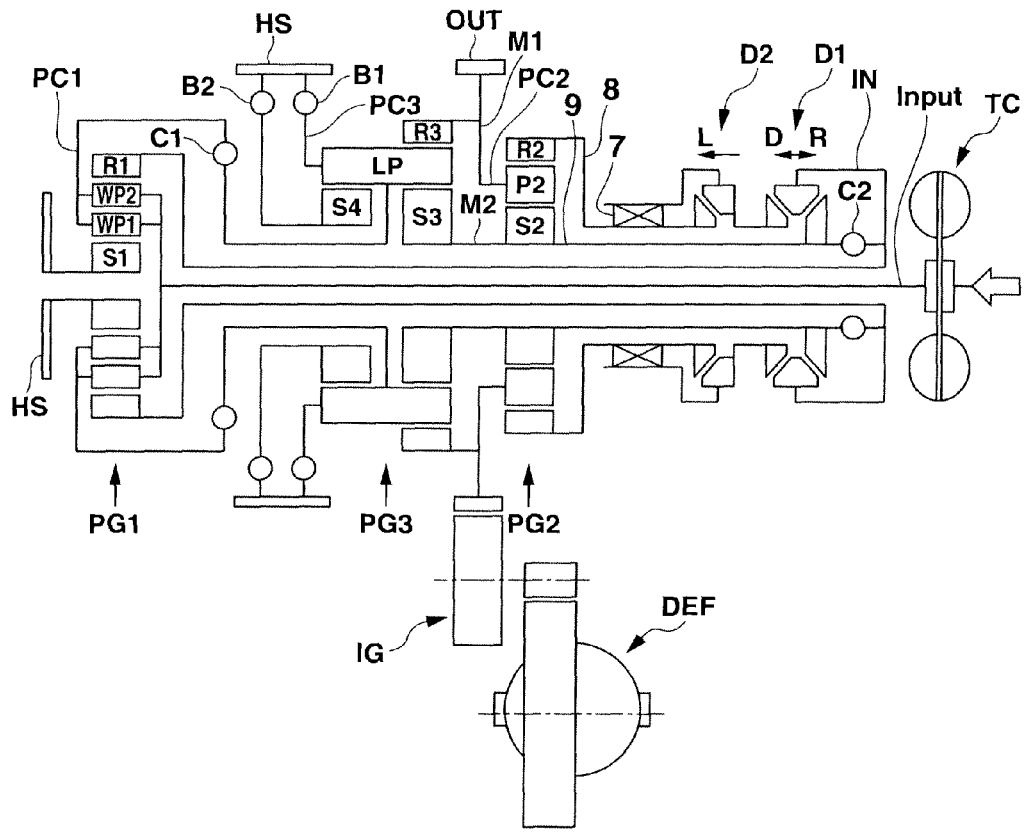
FIG. 9 is a skeleton diagram of a fourth embodiment of a stepped automatic transmission.

FIG. 9 shows the skeleton diagram of the stepped automatic transmission of the fourth embodiment. The automatic transmission of the fourth embodiment includes a torque converter TC that provides a torque-multiplication effect by which a driving force (driving torque) inputted from a driving power source (e.g., an engine) is multiplied, first and second meshing mechanisms D1 and D2 by means of which a power-transmission path (a power-flow path) is switched, and a gear train comprised of a planetary gear system. As shown in FIG. 9, as a gear train, a double-pinion type planetary gearset PG1, a simple planetary gearset PG2, and a double-sun-gear type planetary gearset PG3.

Double-pinion type planetary gearset PG1 has a first sun gear S1, a first ring gear R1, a first pinion WP1 meshed with the first sun gear S1, and a second pinion WP2 meshed with both of the first pinion WP1 and the first ring gear R1. First and second pinions WP1-WP2 are rotatably supported on a first pinion carrier PC1.

Simple planetary gearset PG2 has a second sun gear S2, a second ring gear R2, a second pinion (a single pinion) P2 meshed with both of the second sun gear S2 and the second ring gear R2, and a second pinion carrier PC2 on which the second pinion P2 is rotatably supported.

Double-sun-gear type planetary gearset PG3 has a third sun gear S3, a fourth sun gear S4, a third ring gear R3, a long pinion LP meshed with all of the third sun gear S3, the fourth sun gear S4, and the third ring gear R3, and a third pinion carrier PC3 on which the long pinion LP is rotatably supported.

Also provided are a first rotary member M1 through which second pinion carrier PC2 and third ring gear R3 are always connected to each other and a second rotary member M2 through which second sun gear S2 and third sun gear S3 are always connected to each other. Double-pinion type planetary gearset PG1, simple planetary gearset PG2, and double-sun-gear type planetary gearset PG3, and first and second rotary members M1-M2 construct one planetary gear system PG. The planetary gear system PG (PG1-PG3) has the input member IN connected to the first ring gear R1, the first rotating part 8 connected to the second ring gear R2, and the second rotating part 9 connected to the second rotary member M2 (the second sun gear S2 and the third sun gear S3). The first sun gear S1 is always locked to the housing HS. Power outputted from torque converter TC is always transmitted via a transmission input shaft Input to the first pinion carrier PC1.

[Construction of Friction Elements of Automatic Transmission]

The automatic transmission is provided with two clutches (a first friction element C1 and a fourth friction element C2) and two brake bands (a second friction element B1 and a third friction element B2). First friction element C1 is provided between the first pinion carrier PC1 and the third pinion carrier PC3, for selectively connecting the first pinion carrier PC1 to the third pinion carrier PC3. Second friction element B1 is provided between the third pinion carrier PC3 and the housing HS for selectively locking the third pinion carrier PC3 to the housing HS. Third friction element B2 is provided between the fourth sun gear S4 and the housing HS for selectively locking the fourth sun gear S4 to the housing HS. Fourth friction element C2 is provided between the input member IN and the second rotating part 9 for selectively connecting the input member IN to the second rotating part 9. Output shaft OUT has an output gear formed thereon. Driving torque (driving force) is delivered from the output gear through a counter gear IG and a differential gear DEF to the driving wheels (not shown). In a similar manner to the first embodiment, in the fourth embodiment, output shaft OUT is compactly housed and enclosed by means of the second friction element B1, the third friction element B2, and the housing HS, all constructing band brakes, and thus the automatic transmission of the fourth embodiment is suited for a front-engine front-drive (FF) automobile.

Figure 10:
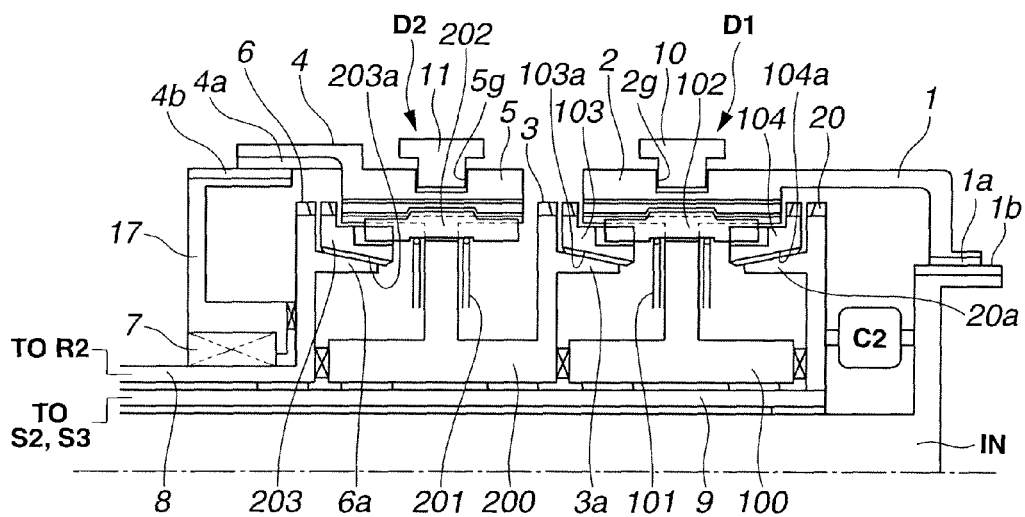
FIG. 10 is an enlarged cross-sectional view illustrating the structure of each of first and second meshing mechanisms used in the transmission of the fourth embodiment.

FIG. 10 shows the enlarged cross section of each of first and second meshing mechanisms D1 and D2 used in the transmission of the fourth embodiment. As discussed above, the constructions of first and second meshing mechanisms D1-D2 of the automatic transmission of the fourth embodiment are basically similar to those of the first embodiment. That is, the basic construction of the automatic transmission of the fourth embodiment is similar to that of the first embodiment, except that input member IN is axially arranged to extend from the side of first ring gear R1 (the left-hand end, viewing FIG. 9) toward the right-hand end (viewing FIG. 9) of the transmission, the fourth friction element C2 is provided between the input member IN and the second rotating part 9, and the rotary member 17 is not connected to other rotating elements (other rotating members).

[Shift Stages Achieved by Automatic Transmission]

Figures 11, 12:
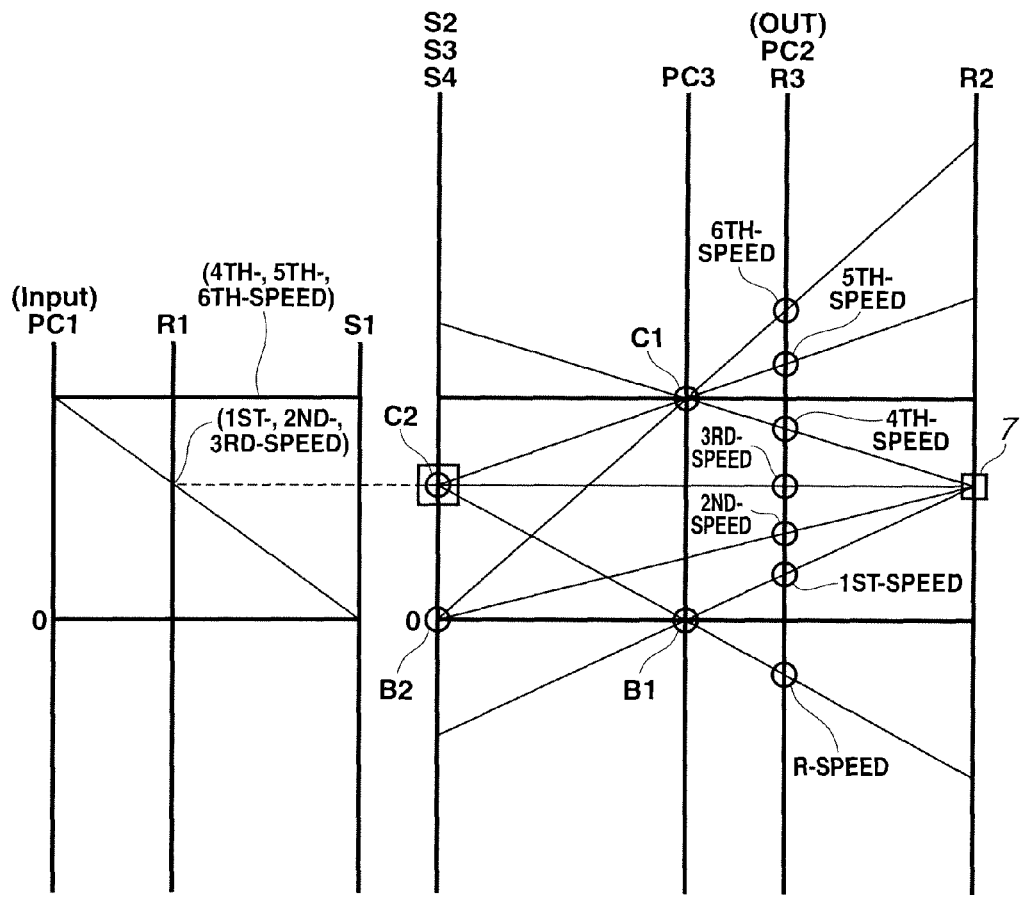
FIG. 11 is a clutch-engagement and band-application chart for engagement/disengagement (application/release) of each of friction elements of the transmission of the fourth embodiment, for all shift stages.
FIG. 12 is an alignment chart of the transmission of the fourth embodiment.

FIG. 11 shows the clutch-engagement and brake-band-application chart for engagement/disengagement (application/release) of each of friction elements of the transmission of the fourth embodiment, for all shift stages. FIG. 12 shows the alignment chart of the transmission of the fourth embodiment. In FIG. 11, clutch-engagement or band-application is marked with a voided circle indicated by a fine solid line, whereas clutch-disengagement or band-release is indicated by a blank space.

(In Case of D-Range Selection)

A first-speed gear is achieved by application of the second friction element B1. A second-speed gear is achieved by application of the third friction element B2. A third-speed gear is achieved by engagement of the fourth friction element C2. A fourth-speed gear is achieved by engagement of the first friction element C1. Regarding first and second meshing mechanisms D1-D2, only the first meshing mechanism D1 (exactly, the O-side of first meshing mechanism D1) is engaged. Hence, with the engine driving the vehicle (in the presence of driving-torque input from the engine to the transmission), one-way clutch 7 is engaged and thereby rotation (driving torque), which has been speed-reduced by double-pinion type planetary gearset PG1, is inputted from the first ring gear R1 (input member IN) to the second ring gear R2 of simple planetary gearset PG2. In contrast, with the vehicle coasting or freewheeling, one-way clutch 7 becomes disengaged and hence there is no engine braking effect.

A fifth-speed gear is achieved by engagement of the first friction element C1 and engagement of the fourth friction element D2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), driving torque (driving force) is inputted from the third pinion carrier PC3 through the first friction element C1. At the same time, with the fourth friction element D2 engaged, rotation of the first ring gear R1 is also transmitted to the second rotary member M2. That is, in the case of the D-range 5th-speed gear position, with the fourth friction element D2 engaged, the second ring gear R2 is always rotating faster than the first ring gear R1 (input member IN) and thus one-way clutch 7 is kept in its disengaged state and hence there is no coupling action via one-way clutch 7, and thereby always an engine-braking force acts. However, in the D-range 5th-speed gear position, due to a transmission ratio set to a vehicle-speed-increase side, so great engine braking force does not act.

A sixth-speed gear is achieved by engagement of the first friction element C1 and application of the third friction element B2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), driving torque (driving force) is inputted from the third pinion carrier PC3 through the first friction element C1. At the same time, with the third friction element B2 applied, the fourth sun gear S4 is locked to the housing HS. That is, in the case of the D-range 6th-speed gear position, with the third friction element B2 applied, the second ring gear R2 is always rotating faster than the first ring gear R1 (input member IN) and thus one-way clutch 7 is kept in its disengaged state and hence there is no coupling action via one-way clutch 7, and thereby always an engine-braking force acts. However, in the D-range 6th-speed gear position, due to a transmission ratio set to a vehicle-speed-increase side, so great engine braking force does not act.

(In Case of L-Range Selection)

In the case of the L-range selection, friction elements are engaged or applied in a manner similar to the previously-discussed D-range selection. Additionally, as can be seen from the clutch-engagement and band-application chart of FIG. 11, the second meshing mechanism D2 (exactly, the L-side of second meshing mechanism 92) as well as the first meshing mechanism D1 (exactly, the D-side of first meshing mechanism D1) is engaged. With the second meshing mechanism D2 engaged, the first rotating part 8 and the rotary member 17 (that is, input member IN) are coupled with each other not via one-way clutch 7. The L-range selection differs from the D-range selection in that, with the vehicle coasting, an engine braking force acts at each of the L-range 1st-speed gear position, the L-range 2nd-speed gear position, the L-range 3rd-speed gear position, and the L-range 4th-speed gear position by virtue of the action of one-way clutch 7.

(In Case of R-Range Selection)

A reverse-speed gear is achieved by application of the second friction element D1. Regarding first and second meshing mechanisms D1-D2, only the first meshing mechanism D1 (exactly, the R-side of first meshing mechanism D1) is engaged, that is, the first sleeve 2 and the third clutch gear 20 are meshed with each other. Hence, with the engine driving the vehicle (in the presence of driving-torque input from the engine to the transmission), rotation (driving torque), which has been speed-reduced by double-pinion type planetary gearset PG1, is inputted from the first ring gear R1 (input member IN) via the third clutch gear 20 to the second rotary member M2. At this time, there is no power transmission via one-way clutch 7, and thereby an engine-braking force acts even with the vehicle coasting.

As discussed above, the automatic transmission of the fourth embodiment can provide the following operation and effects (7) in addition to the previously-described operation and effects (1)-(3) achieved by the first embodiment.

(7) The automatic transmission further includes a double-pinion type planetary gearset PG1 (a first planetary gearset) having a first sun gear S1 always locked to a housing HS (a stationary member), a first ring gear R1 connected to the input member IN, a first pinion WP1 connected to a transmission input shaft Input and meshed with the first sun gear S1, and a second pinion WP2 connected to the transmission input shaft Input and meshed with both of the first pinion WP1 and the first ring gear R1, and a first pinion carrier PC1 on which the first and second pinions WP1-WP2 (a first double pinion) are rotatably supported, a simple planetary gearset PG2 (a second planetary gearset) having a second sun gear S2 serving as a second rotating part 9, a second ring gear R2 serving as a first rotating part 8, a single pinion P2 meshed with both of the second sun gear S2 and the second ring gear R2, and a second pinion carrier PC2 on which the single pinion P2 is rotatably supported, a double-sun-gear type planetary gearset PG3 (a third planetary gearset) having a third sun gear S3, a fourth sun gear S4, a third ring gear R3, a long pinion LP meshed with all of the third sun gear S3, the fourth sun gear S4, and the third ring gear R3, and a third pinion carrier PC3 on which the long pinion LP is rotatably supported, an output shaft OUT always connected to the second pinion carrier PC2, a first rotary member M1 through which the second pinion carrier PC2 and the third ring gear R3 are always connected to each other, a second rotary member M2 through which the second sun gear S2 and the third sun gear S3 are always connected to each other, a first friction element C1 for selectively connecting the first pinion carrier PC1 to the third pinion carrier PC3, a second friction element B1 for selectively locking up the third pinion carrier PC3 to hold the third pinion carrier PC3 stationary, a third friction element B2 for selectively locking up the fourth sun gear S4 to hold the fourth sun gear S4 stationary, and a fourth friction element C2 for selectively connecting the first ring gear R1 to the third clutch gear 20, thereby achieving six forward speeds and one reverse speed.

Therefore, it is possible to connect the rotating element (i.e., the rotating member) to the input member IN via the meshing mechanism (D1; D2), while simplifying control data, and whereby it is possible to provide an automatic transmission that achieves six forward speeds and one reverse speed with a greatly enhanced power-transmission efficiency.

Fifth Embodiment

Figure 13:
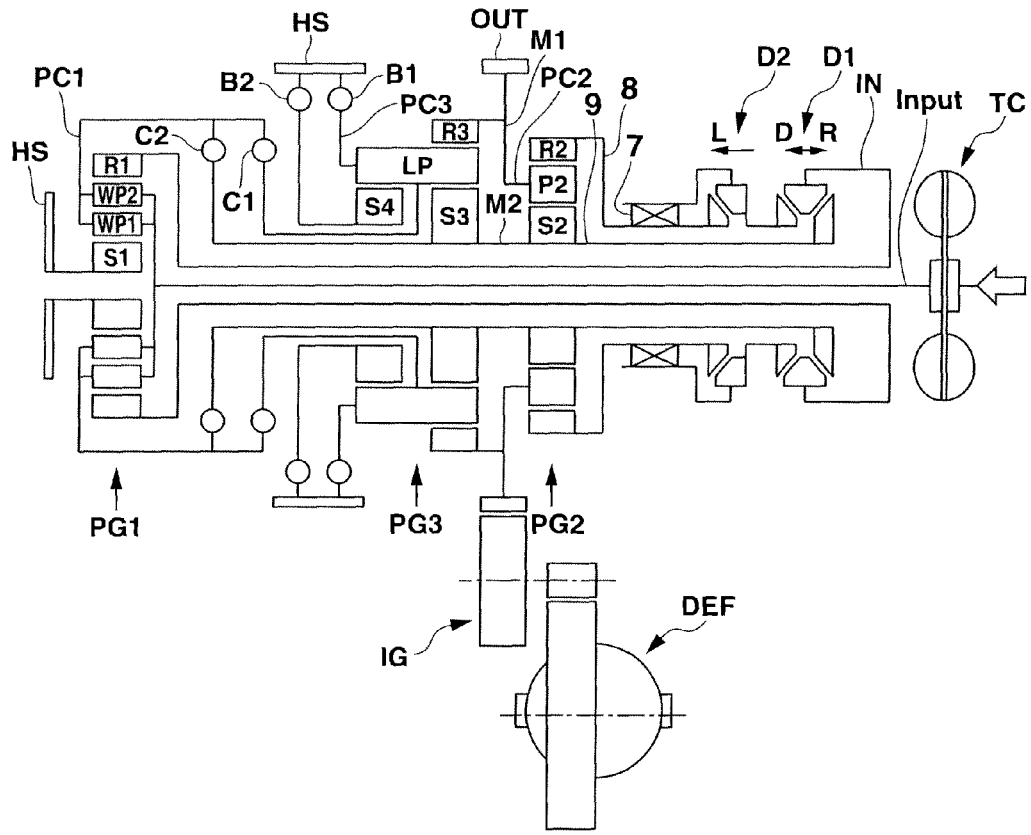
FIG. 13 is a skeleton diagram of a fifth embodiment of a stepped automatic transmission.
Figure 14:
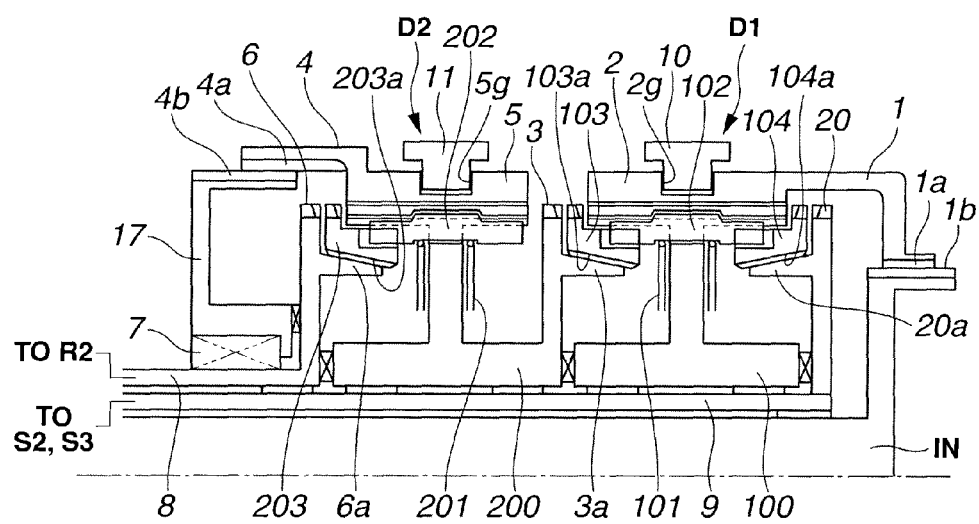
FIG. 14 is an enlarged cross-sectional view illustrating the structure of each of first and second meshing mechanisms used in the transmission of the fifth embodiment.
Figure 15:
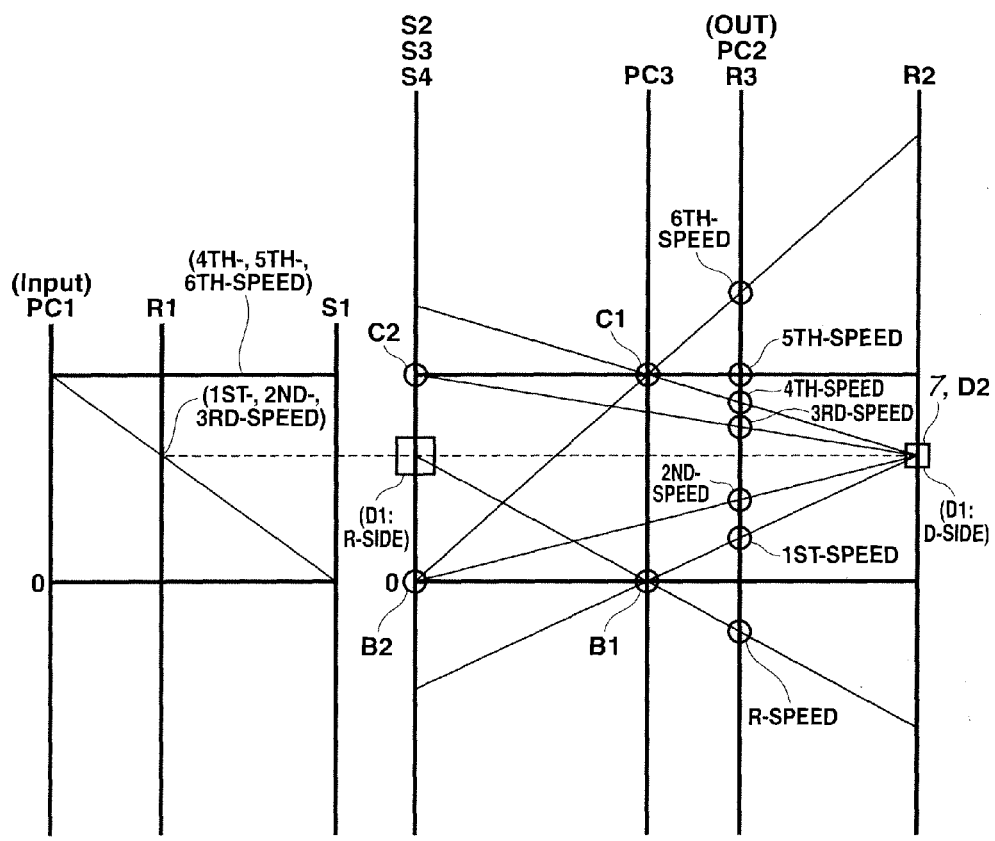
FIG. 15 is an alignment chart of the transmission of the fifth embodiment.
Figure 16:
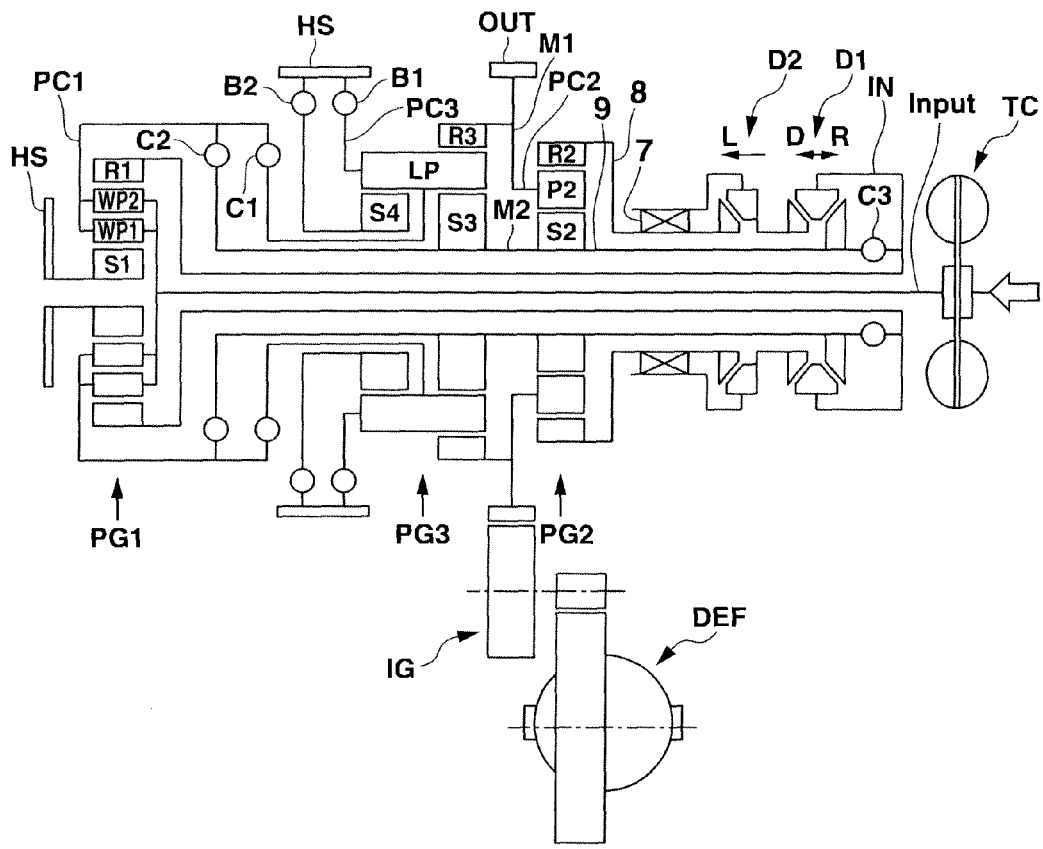
FIG. 16 is a skeleton diagram of a sixth embodiment of a stepped automatic transmission.
Figure 17:
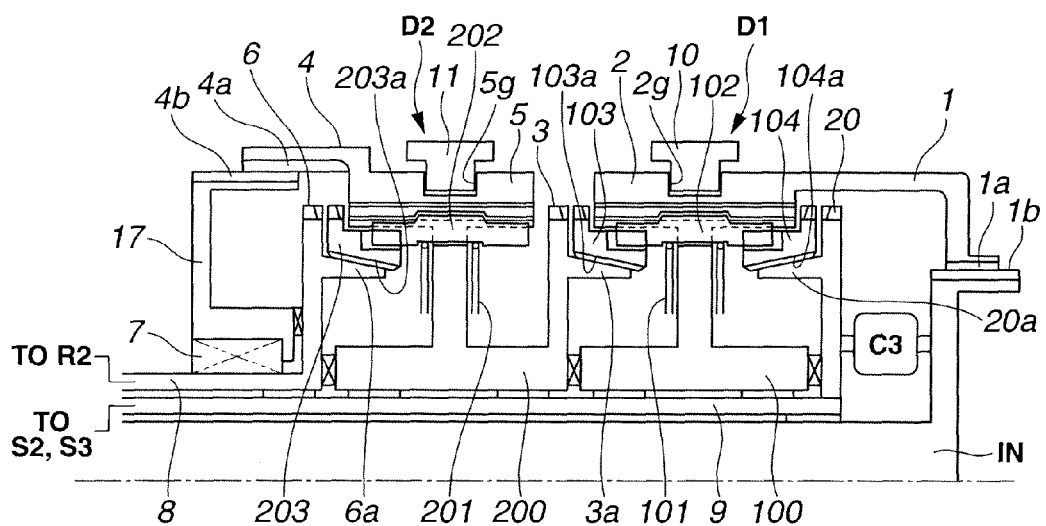
FIG. 17 is an enlarged cross-sectional view illustrating the structure of each of first and second meshing mechanisms used in the transmission of the sixth embodiment.

Referring now to FIGS. 13-15, there is shown the stepped automatic transmission of the fifth embodiment. The basic construction of the automatic transmission of the fifth embodiment is similar to that of the fourth embodiment, and thus only the point of the transmission of the fifth embodiment, differing from the fourth embodiment, is hereunder described. FIG. 13 shows the skeleton diagram of the stepped automatic transmission of the fifth embodiment. The automatic transmissions of the fourth and fifth embodiments somewhat differ from each other, in that in the fourth embodiment (see FIG. 9) the fourth friction element C2 is provided between the input member IN and the second rotating part 9, whereas in the fifth embodiment (see FIG. 13) the fourth friction element C2 is provided between the first pinion carrier PC1 and the second rotating part 9.

FIG. 14 shows the enlarged cross section of each of first and second meshing mechanisms D1 and D2 used in the transmission of the fifth embodiment. The basic construction of the automatic transmission of the fifth embodiment is similar to that of the fourth embodiment, except that the fourth friction element C2 is not provided between the input member IN and the second rotating part 9.
[Shift Stages Achieved by Automatic Transmission]

The clutch-engagement and brake-band-application chart for engagement/disengagement (application/release) of each of friction elements of the transmission of the fifth embodiment is the same as the fourth embodiment (refer to the chart shown in FIG. 11). FIG. 15 shows the alignment chart of the transmission of the fifth embodiment.
(In Case of D-Range Selection)

A first-speed gear is achieved by application of the second friction element B1. A second-speed gear is achieved by application of the third friction element B2. A third-speed gear is achieved by engagement of the fourth friction element C2. A fourth-speed gear is achieved by engagement of the first friction element C1. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), one-way clutch 7 is engaged and thereby rotation (driving torque), which has been speed-reduced by double-pinion type planetary gearset PG1, is inputted from the first ring gear R1 (input member IN) to the second ring gear R2 of simple planetary gearset PG2. In contrast, with the vehicle coasting or freewheeling, one-way clutch 7 becomes disengaged and hence there is no engine braking effect.

A fifth-speed gear is achieved by engagement of the first friction element C1 and engagement of the fourth friction element C2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), driving torque (driving force) is inputted from the third pinion carrier PC3 through the first friction element C1. At the same time, with the fourth friction element C2 engaged, rotation of the first pinion carrier PC1 is also transmitted to the second rotary member M2. That is, in the case of the D-range 5th-speed gear position, with the fourth friction element C2 engaged, the second ring gear R2 is always rotating at the same angular velocity as the first ring gear R1 (input member IN) and hence there is no coupling action via one-way clutch 7, and thereby always an engine-braking force acts. However, in the D-range 5th-speed gear position, due to a transmission ratio set to a vehicle-speed-increase side, so great engine braking force does not act.

A sixth-speed gear is achieved by engagement of the first friction element C1 and application of the third friction element D2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), driving torque (driving force) is inputted from the third pinion carrier PC3 through the first friction element C1. At the same time, with the third friction element D2 applied, the fourth sun gear S4 is locked to the housing HS. That is, in the case of the D-range 6th-speed gear position, with the third friction element B2 applied, the second ring gear R2 is always rotating faster than the first ring gear R1 (input member IN) and thus one-way clutch 7 is kept in its disengaged state and hence there is no coupling action via one-way clutch 7, and thereby always an engine-braking force acts. However, in the D-range 6th-speed gear position, due to a transmission ratio set to a vehicle-speed-increase side, so great engine braking force does not act.
(In Case of L-Range Selection)

In the case of the L-range selection, friction elements are engaged or applied in a manner similar to the previously-discussed D-range selection. Additionally, as can be seen from the clutch-engagement and band-application chart of FIG. 11, the second meshing mechanism D2 (exactly, the L-side of second meshing mechanism D2) as well as the first meshing mechanism D1 (exactly, the D-side of first meshing mechanism D1) is engaged. With the second meshing mechanism D2 engaged, the first rotating part 8 and the rotary member 17 (that is, input member IN) are coupled with each other not via one-way clutch 7. The L-range selection differs from the D-range selection in that, with the vehicle coasting, an engine braking force acts at each of the L-range 1st-speed gear position, the L-range 2nd-speed gear position, the L-range 3rd-speed gear position, and the L-range 4th-speed gear position by virtue of the action of one-way clutch 7.
(In Case of R-Range Selection)

A reverse-speed gear is achieved by application of the second friction element B1. Regarding first and second meshing mechanisms D1-D2, only the first meshing mechanism D1 (exactly, the R-side of first meshing mechanism D1) is engaged, that is, the first sleeve 2 and the third clutch gear 20 are meshed with each other. Hence, with the engine driving the vehicle (in the presence of driving-torque input from the engine to the transmission), rotation (driving torque), which has been speed-reduced by double-pinion type planetary gearset PG1, is inputted from the first ring gear R1 (input member IN) via the third clutch gear 20 to the second rotary member M2. At this time, there is no power transmission via one-way clutch 7, and thereby an engine-braking force acts even with the vehicle coasting.

As discussed above, the automatic transmission of the fifth embodiment can provide the following operation and effects (8) in addition to the previously-described operation and effects (1)-(3) achieved by the first embodiment.

(8) The automatic transmission further includes a double-pinion type planetary gearset PG1 (a first planetary gearset) having a first sun gear S1 always locked to a housing HS (a stationary member), a first ring gear R1 connected to the input member IN, a first pinion WP1 connected to a transmission input shaft Input and meshed with the first sun gear S1, a second pinion WP2 connected to the transmission input shaft Input and meshed with both of the first pinion WP1 and the first ring gear R1, and a first pinion carrier PC1 on which the first and second pinions WP1-WP2 (a first double pinion) are rotatably supported, a simple planetary gearset PG2 (a second planetary gearset) having a second sun gear S2 serving as a second rotating part 9, a second ring gear R2 serving as a first rotating part 8, a single pinion P2 meshed with both of the second sun gear S2 and the second ring gear R2, and a second pinion carrier PC2 on which the single pinion P2 is rotatably supported, a double-sun-gear type planetary gearset PG3 (a third planetary gearset) having a third sun gear S3, a fourth sun gear S4, a third ring gear R3, a long pinion LP meshed with all of the third sun gear S3, the fourth sun gear S4, and the third ring gear R3, and a third pinion carrier PC3 on which the long pinion LP is rotatably supported, an output shaft OUT always connected to the second pinion carrier PC2, a first rotary member M1 through which the second pinion carrier PC2 and the third ring gear R3 are always connected to each other, a second rotary member M2 through which the second sun gear S2 and the third sun gear S3 are always connected to each other, a first friction element C1 for selectively connecting the first pinion carrier PC1 to the third pinion carrier PC3, a second friction element B1 for selectively locking up the third pinion carrier PC3 to hold the third pinion carrier PC3 stationary, a third friction element B2 for selectively locking up the fourth sun gear S4 to hold the fourth sun gear S4 stationary, and a fourth friction element C2 for selectively connecting the first pinion carrier PC1 to the second rotary member M2 (the second rotating part 9), thereby achieving six forward speeds and one reverse speed.

Therefore, it is possible to connect the rotating element (i.e., the rotating member) to the input member IN via the meshing mechanism (D1; D2), while simplifying control data, and whereby it is possible to provide an automatic transmission that achieves six forward speeds and one reverse speed with a greatly enhanced power-transmission efficiency.

Sixth Embodiment

Referring now to FIGS. 16-19, there is shown the skeleton diagram of the stepped automatic transmission of the sixth embodiment. As appreciated from comparison between the skeleton diagrams of FIGS. 14 and 16, the basic construction of the automatic transmission of the sixth embodiment (see FIG. 16) is similar to that of the fifth embodiment (see FIG. 14), except that, in the sixth embodiment, the fourth friction element C2 used in the automatic transmission of the fourth embodiment (see FIG. 9) is added as a fifth friction element C3, which is provided between the input member IN and the second rotating part 9 for selectively connecting the input member IN to the second rotating part 9. That is, the automatic transmission of the sixth embodiment is provided with three clutches (i.e., the first, fourth, and fifth friction elements C1, C2, and C3) and two brake bands (i.e., the second and third friction elements B1 and B2).

[Shift Stages Achieved by Automatic Transmission]

Figures 18, 19:
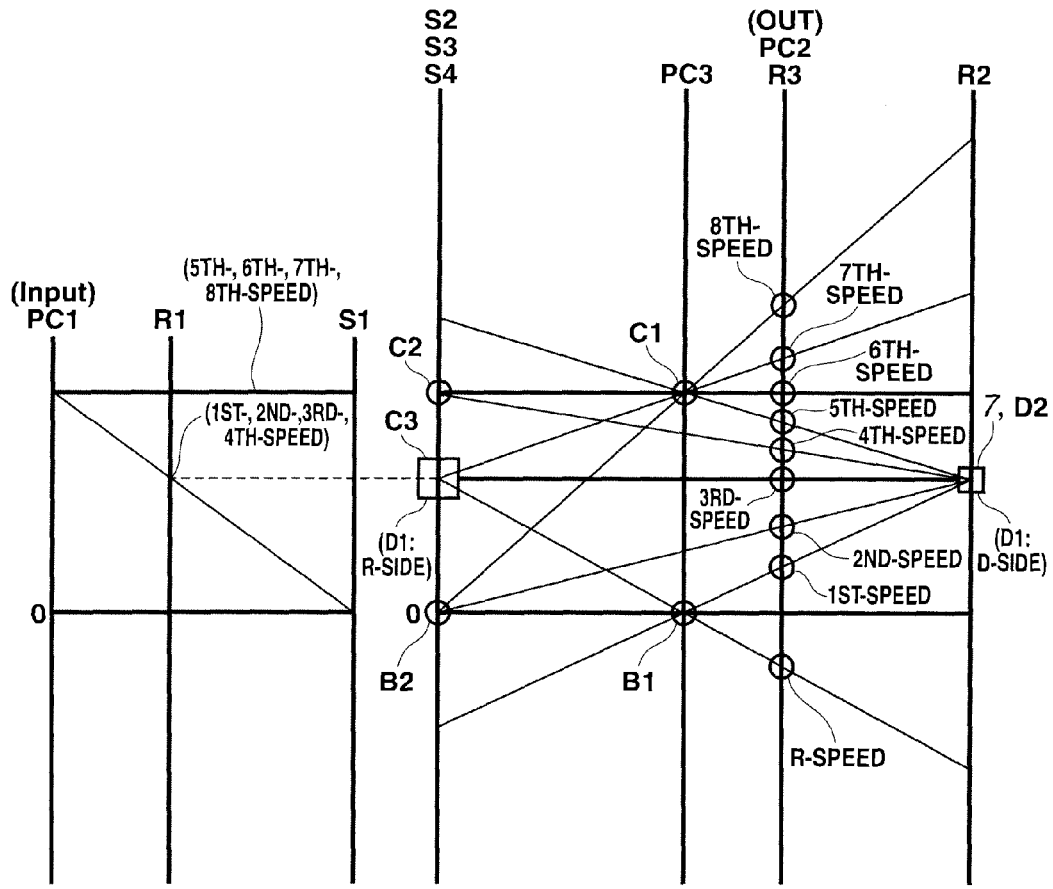
FIG. 18 is a clutch-engagement and band-application chart for engagement/disengagement (application/release) of each of friction elements of the transmission of the sixth embodiment, for all shift stages.
FIG. 19 is an alignment chart of the transmission of the sixth embodiment.

FIG. 18 shows the clutch-engagement and brake-band-application chart for engagement/disengagement (application/release) of each of friction elements of the transmission of the sixth embodiment, for all shift stages. FIG. 19 shows the alignment chart of the transmission of the sixth embodiment. In FIG. 18, clutch-engagement or band-application is marked with a voided circle indicated by a fine solid line, whereas clutch-disengagement or band-release is indicated by a blank space.

(In Case of D-Range Selection)

A first-speed gear is achieved by application of the second friction element B1. A second-speed gear is achieved by application of the third friction element B2. A third-speed gear is achieved by engagement of the fifth friction element C3. A fourth-speed gear is achieved by engagement of the fourth friction element C2. A fifth-speed gear is achieved by the first friction element C1. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), one-way clutch 7 is engaged and thereby rotation (driving torque), which has been speed-reduced by double-pinion type planetary gearset PG1, is inputted from the first ring gear R1 (input member IN) to the second ring gear R2 of simple planetary gearset PG2. In contrast, with the vehicle coasting or freewheeling, one-way clutch 7 becomes disengaged and hence there is no engine braking effect.

A sixth-speed gear is achieved by engagement of the first friction element C1 and engagement of the fourth friction element C2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), driving torque (driving force) is inputted from the third pinion carrier PC3 through the first friction element C1. At the same time, with the fourth friction element C2 engaged, rotation of the first pinion carrier PC1 is also transmitted to the second rotary member M2. That is, in the case of the D-range 6th-speed gear position, with the fourth friction element C2 engaged, the second ring gear R2 is always rotating at the same angular velocity as the first ring gear R1 (input member IN) and hence there is no coupling action via one-way clutch 7, and thereby always an engine-braking force acts. However, in the D-range 6th-speed gear position, due to a transmission ratio set to a vehicle-speed-increase side, so great engine braking force does not act.

A seventh-speed gear is achieved by engagement of the first friction element C1 and engagement of the fifth friction element C3. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), driving torque (driving force) is inputted from the third pinion carrier PC3 through the first friction element C1. At the same time, with the fifth friction element C3 engaged, rotation of the first ring gear R1 is also transmitted to the second rotary member M2. That is, in the case of the D-range 7th-speed gear position, with the fifth friction element C3 engaged, the second ring gear R2 is always rotating faster than the first ring gear R1 (input member IN) and thus one-way clutch 7 is kept in its disengaged state and hence there is no coupling action via one-way clutch 7, and thereby always an engine-braking force acts. However, in the O-range 7th-speed gear position, due to a transmission ratio set to a vehicle-speed-increase side, so great engine braking force does not act.

An eighth-speed gear is achieved by engagement of the first friction element C1 and application of the third friction element B2. Regarding first and second meshing mechanisms D1-D2, only the first meshing mechanism D1 (exactly, the D-side of first meshing mechanism D1) is engaged. Hence, with the engine driving the vehicle (in the presence of driving-torque input from the engine to the transmission), driving torque (driving force) is inputted from the third pinion carrier PC3 through the first friction element C1. At the same time, with the third friction element B2 applied, the fourth sun gear S4 is locked to the housing HS. That is, in the case of the D-range 8th-speed gear position, with the third friction element B2 applied, the second ring gear R2 is always rotating faster than the first ring gear R1 (input member IN) and thus one-way clutch 7 is kept in its disengaged state and hence there is no coupling action via one-way clutch 7, and thereby always an engine-braking force acts. However, in the D-range 8th-speed gear position, due to a transmission ratio set to a vehicle-speed-increase side, so great engine braking force does not act.

(In Case of L-Range Selection)

In the case of the L-range selection, friction elements are engaged or applied in a manner similar to the previously-discussed D-range selection. Additionally, as can be seen from the clutch-engagement and band-application chart of FIG. 18, the second meshing mechanism D2 (exactly, the L-side of second meshing mechanism D2) as well as the first meshing mechanism D1 (exactly, the D-side of first meshing mechanism D1) is engaged. With the second meshing mechanism D2 engaged, the first rotating part 8 and the rotary member 17 (that is, input member IN) are coupled with each other not via one-way clutch 7. The L-range selection differs from the D-range selection in that, with the vehicle coasting, an engine braking force acts at each of the L-range 1st-speed gear position, the L-range 2nd-speed gear position, the L-range 3rd-speed gear position, the L-range 4th-speed gear position, and the L-range 5th-speed gear position by virtue of the action of one-way clutch 7.

(In Case of R-Range Selection)

A reverse-speed gear is achieved by application of the second friction element B1. Regarding first and second meshing mechanisms D1-D2, only the first meshing mechanism D1 (exactly, the R-side of first meshing mechanism D1) is engaged, that is, the first sleeve 2 and the third clutch gear 20 are meshed with each other. Hence, with the engine driving the vehicle (in the presence of driving-torque input from the engine to the transmission), rotation (driving torque), which has been speed-reduced by double-pinion type planetary gearset PG1, is inputted from the first ring gear R1 (input member IN) via the third clutch gear 20 to the second rotary member M2. At this time, there is no power transmission via one-way clutch 7, and thereby an engine-braking force acts even with the vehicle coasting.

As discussed above, the automatic transmission of the sixth embodiment can provide the following operation and effects (9) in addition to the previously-described operation and effects (1)-(3) achieved by the first embodiment.

(9) The automatic transmission further includes a double-pinion type planetary gearset PG1 (a first planetary gearset) having a first sun gear S1 always locked to a housing HS (a stationary member), a first ring gear R1 connected to an input member IN, a first pinion WP1 connected to a transmission input shaft Input and meshed with the first sun gear S1, and a second pinion WP2 connected to the transmission input shaft Input and meshed with both of the first pinion WP1 and the first ring gear R1, and a first pinion carrier PC1 on which the first and second pinions WP1-WP2 (a first double pinion) are rotatably supported, a simple planetary gearset PG2 (a second planetary gearset) having a second sun gear S2 serving as a second rotating part 9, a second ring gear R2 serving as a first rotating part 8, a single pinion P2 meshed with both of the second sun gear S2 and the second ring gear R2, and a second pinion carrier PC2 on which the single pinion P2 is rotatably supported, a double-sun-gear type planetary gearset PG3 (a third planetary gearset) having a third sun gear S3, a fourth sun gear S4, a third ring gear R3, a long pinion LP meshed with all of the third sun gear S3, the fourth sun gear S4, and the third ring gear R3, and a third pinion carrier PC3 on which the long pinion LP is rotatably supported, an output shaft OUT always connected to the second pinion carrier PC2, a first rotary member M1 through which the second pinion carrier PC2 and the third ring gear R3 are always connected to each other, a second rotary member M2 through which the second sun gear S2 and the third sun gear S3 are always connected to each other, a first friction element C1 for selectively connecting the first pinion carrier PC1 to the third pinion carrier PC3, a second friction element B1 for selectively locking up the third pinion carrier PC3 to hold the third pinion carrier PC3 stationary, a third friction element B2 for selectively locking up the fourth sun gear S4 to hold the fourth sun gear S4 stationary, a fourth friction element C2 for selectively connecting the first pinion carrier PC1 to the second rotary member M2 (the second rotating part 9), and a fifth friction element C3 for selectively connecting the first ring gear R1 to the third clutch gear 20, thereby achieving eight forward speeds and one reverse speed.

Therefore, it is possible to connect the rotating element (i.e., the rotating member) to the input member IN via the meshing mechanism (D1; D2), while simplifying control data, and whereby it is possible to provide an automatic transmission that achieves eight forward speeds and one reverse speed with a greatly enhanced power-transmission efficiency.

The entire contents of Japanese Patent Application No. 2010-286332 (filed Dec. 22, 2010) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automatic transmission having a reverse range for backward-running, a neutral range without power transmission, a drive range for forward-running by automatic gear shifting, and a low range for forward-running at a given shift stage, and disabling an engine braking force to act at the given shift stage when the drive range is selected by manually operating a selector lever, and enabling an engine braking force to act at the given shift stage when the low range is manually selected, comprising:

an input member adapted to be connected to a transmission input shaft;

a first meshing mechanism having a first hub rotating with the input member, a first sleeve rotating with the first hub and configured to be slidable in two opposite rotation-axis directions, and a first clutch gear configured to be rotatable together with the first sleeve by bringing the first clutch gear into meshed-engagement with the first sleeve by an axial sliding motion of the first sleeve;

a second meshing mechanism having a second hub rotating with the first clutch gear, a second sleeve rotating with the second hub and configured to be slidable in the two opposite rotation-axis directions, and a second clutch gear configured to be rotatable together with the second sleeve by bringing the second clutch gear into meshed-engagement with the second sleeve by an axial sliding motion of the second sleeve;

a one-way clutch provided between the second hub and the second clutch gear and configured to run free when a revolution speed of the second clutch gear is higher than that of the second hub;

a first linkage for bringing the first meshing mechanism into meshed-engagement with the first clutch gear by sliding the first sleeve in synchronism with manual movement of the selector lever from the neutral range to the drive range;

a second linkage for bringing the second meshing mechanism into meshed-engagement with the second clutch gear by sliding the second sleeve in synchronism with manual movement of the selector lever from the drive range to the low range; and a first rotating part connected to the second clutch gear and configured to permit a driving force to be transmitted from the input member via the one-way clutch to the first rotating part with the first meshing mechanism kept in meshed-engagement with the first clutch gear when the drive range is selected and further configured to permit a driving force to be transmitted from the input member, without the transmitting of the driving force being via the one-way clutch, to the first rotating part with the first meshing mechanism kept in meshed-engagement with the first clutch gear and the second meshing mechanism kept in meshed-engagement with the second clutch gear when the low range is selected.

2. The automatic transmission as claimed in claim 1, wherein:

the axial sliding motion of the first sleeve is in a first direction of the two opposite rotation-axis directions;

the first meshing mechanism has a third clutch gear configured to be rotatable together with the first sleeve by bringing the third clutch gear into meshed-engagement with the first sleeve by axial sliding motion of the first sleeve in a second direction of the two opposite rotation-axis directions, the second direction being opposed to the first direction;

the first linkage has a linkage for bringing the first meshing mechanism into meshed-engagement with the third clutch gear by sliding the first sleeve in synchronism with manual movement of the selector lever from the neutral range to the reverse range; and a second rotating part is provided to be connected to the third clutch gear and configured to permit a driving force to be transmitted from the input member to the second rotating part with the first sleeve meshed with the third clutch gear when the reverse range is selected.

3. The automatic transmission as claimed in claim 1, wherein:

the first linkage has a first manual plate rotated in synchronism with rotary motion of a manual shaft whose angular displacement is determined based on a manually selected position of the selector lever, and a first shift fork configured to cause the axial sliding motion of the first sleeve, while being engaged with the first sleeve by an angular displacement of the first manual plate caused by manual movement of the selector lever from the neutral range to the drive range, and configured to be disengaged from the first sleeve by an angular displacement of the first manual plate caused by manual movement of the selector lever from the drive range to the low range; and the second linkage has a second manual plate rotated in synchronism with rotary motion of the manual shaft, and a second shift fork configured to cause the axial sliding motion of the second sleeve, while being engaged with the second sleeve by an angular displacement of the second manual plate caused by manual movement of the selector lever from the drive range to the low range, and configured to be disengaged from the second sleeve by an angular displacement of the second manual plate caused by manual movement of the selector lever from the drive range to the neutral range.

4. The automatic transmission as claimed in claim 2, further comprising:

a planetary gearset having a first sun gear connected to the first rotating part, a second sun gear connected to the second rotating part, a ring gear, a short pinion meshed with the first sun gear, a long pinion meshed with all of the short pinion, the second sun gear and the ring gear, and a pinion carrier on which the short pinion and the long pinion are rotatably supported;

an output shaft always connected to the ring gear;

a first friction element for selectively connecting the first clutch gear to the pinion carrier;

a second friction element for selectively locking up the pinion carrier to hold the pinion carrier stationary; and a third friction element for selectively locking up the second sun gear to hold the second sun gear stationary, thereby achieving four forward speeds and one reverse speed.

5. The automatic transmission as claimed in claim 2, further comprising:

a first planetary gearset having a first sun gear connected to the first rotating part, a first ring gear, a first single pinion meshed with both of the first sun gear and the first ring gear, and a first pinion carrier on which the first single pinion is rotatably supported;

a second planetary gearset having a second sun gear connected to the second rotating part, a second ring gear, a second single pinion meshed with both of the second sun gear and the second ring gear, and a second pinion carrier on which the second single pinion is rotatably supported;

an output shaft always connected to the first pinion carrier;

a first rotary member through which the first ring gear and the second pinion carrier are always connected to each other;

a second rotary member through which the first pinion carrier and the second ring gear are always connected to each other;

a first friction element for selectively connecting the first rotary member to the first clutch gear;

a second friction element for selectively locking up the second pinion carrier to hold the second pinion carrier stationary; and a third friction element for selectively locking up the second sun gear to hold the second sun gear stationary, thereby achieving four forward speeds and one reverse speed.

6. The automatic transmission as claimed in claim 2, further comprising:

a first planetary gearset having a first sun gear always locked to a stationary member, a first ring gear connected to the input member, a first pinion connected to a transmission input shaft and meshed with the first sun gear, and a second pinion connected to the transmission input shaft and meshed with both of the first pinion and the first ring gear, and a first pinion carrier on which the first and second pinions are rotatably supported;

a second planetary gearset having a second sun gear serving as the second rotating part, a second ring gear serving as the first rotating part, a single pinion meshed with both of the second sun gear and the second ring gear, and a second pinion carrier on which the single pinion is rotatably supported;

a third planetary gearset having a third sun gear, a fourth sun gear, a third ring gear, a long pinion meshed with all of the third sun gear, the fourth sun gear, and the third ring gear, and a third pinion carrier on which the long pinion is rotatably supported;

an output shaft always connected to the second pinion carrier;

a first rotary member through which the second pinion carrier and the third ring gear are always connected to each other;

a second rotary member through which the second sun gear and the third sun gear are always connected to each other;

a first friction element for selectively connecting the first pinion carrier to the third pinion carrier;

a second friction element for selectively locking up the third pinion carrier to hold the third pinion carrier stationary;

a third friction element for selectively locking up the fourth sun gear to hold the fourth sun gear stationary; and a fourth friction element for selectively connecting the first ring gear to the third clutch gear, thereby achieving six forward speeds and one reverse speed.

7. The automatic transmission as claimed in claim 2, further comprising:

a first planetary gearset having a first sun gear always locked to a stationary member, a first ring gear connected to the input member, a first pinion connected to a transmission input shaft and meshed with the first sun gear, and a second pinion connected to the transmission input shaft and meshed with both of the first pinion and the first ring gear, and a first pinion carrier on which the first and second pinions are rotatably supported;

a second planetary gearset having a second sun gear serving as the second rotating part, a second ring gear serving as the first rotating part, a single pinion meshed with both of the second sun gear and the second ring gear, and a second pinion carrier on which the single pinion is rotatably supported;

a third planetary gearset having a third sun gear, a fourth sun gear, a third ring gear, a long pinion meshed with all of the third sun gear, the fourth sun gear, and the third ring gear, and a third pinion carrier on which the long pinion is rotatably supported;

an output shaft always connected to the second pinion carrier;

a first rotary member through which the second pinion carrier and the third ring gear are always connected to each other;

a second rotary member through which the second sun gear and the third sun gear are always connected to each other;

a first friction element for selectively connecting the first pinion carrier to the third pinion carrier;

a second friction element for selectively locking up the third pinion carrier to hold the third pinion carrier stationary;

a third friction element for selectively locking up the fourth sun gear to hold the fourth sun gear stationary; and a fourth friction element for selectively connecting the first pinion carrier to the second rotary member, thereby achieving six forward speeds and one reverse speed.

8. The automatic transmission as claimed in claim 2, further comprising:

a first planetary gearset having a first sun gear always locked to a stationary member, a first ring gear connected to the input member, a first pinion connected to a transmission input shaft and meshed with the first sun gear, and a second pinion connected to the transmission input shaft and meshed with both of the first pinion and the first ring gear, and a first pinion carrier on which the first and second pinions are rotatably supported;

a second planetary gearset having a second sun gear serving as the second rotating part, a second ring gear serving as the first rotating part, a single pinion meshed with both of the second sun gear and the second ring gear, and a second pinion carrier on which the single pinion is rotatably supported;

a third planetary gearset having a third sun gear, a fourth sun gear, a third ring gear, a long pinion meshed with all of the third sun gear, the fourth sun gear, and the third ring gear, and a third pinion carrier on which the long pinion is rotatably supported;

an output shaft always connected to the second pinion carrier;

a first rotary member through which the second pinion carrier and the third ring gear are always connected to each other;

a second rotary member through which the second sun gear and the third sun gear are always connected to each other;

a first friction element for selectively connecting the first pinion carrier to the third pinion carrier;

a second friction element for selectively locking up the third pinion carrier to hold the third pinion carrier stationary;

a third friction element for selectively locking up the fourth sun gear to hold the fourth sun gear stationary;

a fourth friction element for selectively connecting the first pinion carrier to the second rotary member; and a fifth friction element for selectively connecting the first ring gear to the third clutch gear, thereby achieving eight forward speeds and one reverse speed.

* * * * *